United States Patent [19]

Govaert

[11] Patent Number: 5,692,071

[45] Date of Patent: Nov. 25, 1997

[54] COLOR IMAGE PROCESSING METHOD AND APPARATUS FOR GENERATING DEVICE-DEPENDENT COLOR SIGNALS

[75] Inventor: René Raymond Govaert, Kapellen, Belgium

[73] Assignee: AGFA-Geveart, Mortsel, Belgium

[21] Appl. No.: 397,084

[22] PCT Filed: Jul. 27, 1993

[86] PCT No.: PCT/EP93/02002

§ 371 Date: Mar. 7, 1995

§ 102(e) Date: Mar. 7, 1995

[87] PCT Pub. No.: WO94/06242

PCT Pub. Date: Mar. 17, 1994

[30] Foreign Application Priority Data

Sep. 8, 1992 [EP] European Pat. Off. .............. 92115339

[51] Int. Cl.⁶ ........................................................ G06K 9/00
[52] U.S. Cl. ............................................. 382/167; 358/523
[58] Field of Search ................................. 382/162, 167; 358/518, 523

[56] References Cited

U.S. PATENT DOCUMENTS

| | | | |
|---|---|---|---|
| 4,929,978 | 5/1990 | Kanamori et al. | 355/38 |
| 4,941,039 | 7/1990 | D'Errico | 358/80 |
| 4,949,135 | 8/1990 | Ng | 355/327 |
| 5,121,196 | 6/1992 | Hung | 358/75 |
| 5,305,119 | 4/1994 | Rolleston et al. | 358/522 |
| 5,471,324 | 11/1995 | Rolleston | 358/518 |

FOREIGN PATENT DOCUMENTS 0 144 188  6/1985  European Pat. Off. ......... H04N 1/46

*Primary Examiner*—Andrew Johns
*Attorney, Agent, or Firm*—Richard J. Birch

[57] ABSTRACT

A method and apparatus for finding the stored device independent coordinate triplet (CIEL*a*b*triplet) which is closest to the device-independent target color triplet and then looking up the coordinates in device-dependent ABC space which correspond to this best fit among the color patches. A set of new points is defined in ABC space about the best fit point. The raster for the selection of these points in ABC space is independent of the stored color patch points. The magnitude of the increments away from the best fit color patch can therefore be made as small or large as desired. Using this new set of points about the best fit color match, each point of this set is converted back into CIEL*a*b* space points by interpolation and each of these points is compared with the target color in CIEL*a*b* space and the point determined with the smallest difference thereto, ΔE.

32 Claims, 20 Drawing Sheets

Fig. 2

| Index | Value |
| k | A |
| 0 | Amin |
| 1 | |
| 2 | |
| . | |
| . | |
| . | |
| . | |
| . | |
| . | |
| . | |
| r | Amax |

| Index | Value |
| l | B |
| 0 | Bmin |
| 1 | |
| 2 | |
| . | |
| . | |
| . | |
| . | |
| . | |
| . | |
| s | Bmax |

| Index | Value |
| m | C |
| 0 | Cmin |
| 1 | |
| 2 | |
| . | |
| . | |
| . | |
| . | |
| . | |
| . | |
| t | Cmax |

COLOR IMAGE PROCESSING METHOD AND APPARATUS FOR GENERATING DEVICE-DEPENDENT COLOR SIGNALS

FIELD OF THE INVENTION

The present invention relates to a method and apparatus for color output device characterization applicable to a wide range of color hardcopy technologies. In particular, the present invention provides a color image processing method and apparatus for characterizing the image signals of a color output device using device-independent color representations.

In device-independent color communication, input and output devices (such as scanners and printing devices, respectively) have to be characterized by device-independent color representations such as the CIEXYZ or CIEL*a*b* coordinates. The goal of color characterization of output devices is to define the relation between the device-independent color representation and the device-dependent color image signals which control the amount of colorants (inks, pigments; dyes, toners) used in the device to reproduce a color. Based upon this relation, a specific target color or colors of an original image can be reproduced with a high level of color correspondence. Preferably the color characterization also includes information on the color reproduction range or color gamut of the output devices.

DESCRIPTION OF THE PRIOR ART

The European patent application EU.A. 0 264 281 discloses a method for printing a color on paper which matches a color on a CRT display. The technique is based on linear mixing calculations in the CIExyY color space.

The European patent EU.P. 0 124 908 describes a method for obtaining halftone dot percents required to reproduce the color of a color specimen by printing. The method is based on color density measurement.

SUMMARY OF THE INVENTION

The object of the present invention consists in providing a color image processing method and apparatus for characterizing the color image signal values of a color output device using device-independent color representations (e.g. CIEL*a*b* coordinates). This means that the method and the apparatus of the present invention allows determination of the device-independent color values and generation of signals (e.g. digital signals, corresponding thereto) and hence the color image signal values for a color reproduction device, so that the color reproduction device produces colors which are identical or closest to target colors, in such a way that the human observer is not able to distinguish between the target color and the color produced by the color output device by means of the present invention. This system is universal, i.e. applicable to different color hardcopy technologies (offset, electrophotography, engraving, photography, etc.).

Color image signal values are preferably a combination of three values (a triplet ABC) used to generate three or more color control signals. Color control signals are a combination of three or more device-dependent signals such as, for example, RGB (red, green, blue) or CMYK signals, serving to control the processor of a color reproduction output device so that the latter produces the colors corresponding to these color control signals. They are called device-dependent since the same combination of these color control signals will usually cause different color output devices to produce a different color.

Device-independent color coordinates are used to uniquely define each color of the color spectrum. Device-independent coordinates are, for example, CIEXYZ or CIEL*a*b* coordinates.

A further object of the present invention is to achieve a high level of accuracy by distributing the color samples through the color space. This is done by using a high concentration of samples in the areas of the color gamut of the color output device with non-linear responses.

Another object of the present invention is to achieve high accuracy while keeping the number of calculations low enough to provide a fast method and a practical and efficient apparatus. This is done by interpolating only a limited set of intermediate grid points in the ABC space of the device-dependent color image signal coordinate triplets of a color output device.

Still another object of the present invention is to guarantee a color reproduction with minimum perceived color difference between the target color and the reproduced color. This is achieved by using device-independent coordinates and a ΔE color difference criterion which corresponds closely to the color difference perceived by the human observer.

Universality is achieved by using empirical data, interpolations and a processing method which make no assumptions about physical models or simulations of the color response of the color output device.

In electronic image processing systems digital color transformations, by means of lookup tables, are used to transform various forms of color representations (tristimulus values from color scanners, RGB data for color monitors, CIE coordinates, etc.) into digital signals controlling color hardcopy output devices. For the present invention color samples may preferably be produced with a color output device, using combinations of color image signals, and these samples are preferably measured with a colorimeter or spectrophotometer resulting in device-independent color coordinates. A memory means stores the values of each combination of the color signal values and each corresponding measured device-independent color triplet in the form of a first conversion table, which relates the color image signal values and the measured device-independent color coordinates. When a specific target color, defined by its device-independent coordinate triplet, has to be produced (e.g. printed or exposed on a color film), the stored conversion table can be searched by a processor means to find the color image signal values needed to produce the specific target color. The setup of the conversion table is from color image signal triplets to device-independent coordinate triplets (e.g. CIEL*a*b* triplets). In accordance with present invention a given device-independent coordinate triplet of a target color the device-dependent color image signal can be determined which, when used to generate a color with a color output device, will at least approximate said target color. This means that the color produced with a color output device on the basis of the present invention will be identical to said target color or approximate it in such a way that a human observer will not be able to distinguish between the target color and the color produced by the color output device. Each given target device-independent coordinate triplet and the corresponding device-dependent color image signal triplet determined according to the present invention may preferably be stored in a table as input and output triplets, respectively. This means that predetermined L*a*b* values may be used, which, for example, are equidistant or located at regular intervals or having natural integer values. Such a kind of inverted table may preferably be stored in the memory means of the color output device. With such an inverted table any target device-independent coordinate triplet can easily be transformed by interpolation, e.g. by tri-linear interpolation, into the device-dependent color image signal values, which are used by control drive means to control the generation of colors in the color output device.

The method and the apparatus of the present invention are preferably used with multi-dimensional conversion tables containing data at locations which are not necessarily equidistant. As three-dimensional structures are to be operated on the combined result of three data sources of L*, a* and b* values have to provide a minimum. The present invention preferably does not use a straightforward binary processing method, because such a method is difficult to implement in multi-dimensional data sets and will, in some cases, not converge to the optimum solution, i.e. color image signals producing the smallest possible color difference between the target color and the produced color.

The method of the present invention consists preferably of two phases to determine the color image signal values A, B and C which will produce a desired minimum difference value $\Delta E$, indicative of the difference between a given target color and the closest color produced by a color output device.

During the first phase the method uses only the data stored in the first conversion table to locate a stored ABC triplet (called pivot point or pivot location) having a first smallest $\Delta E$ value. In this first phase preferably no interpolation is used to calculate additional data values. The method may already be ended after this first phase. During the second phase processor means sample a small search range around the pivot point, i.e. the above mentioned stored ABC triplet found in phase one, and the results obtained by any appropriate interpolation (e.g. tri-linear interpolation) are used to perform further steps (explained further on) leading to the device-dependent triplet with the desired minimum value of $\Delta E$. Tri-linear interpolation is, for example, explained in the article "Color Gamut Mapping and the Printing of Digital Color Images" of M. C. Stone et al, published in ACM Transactions on Graphics, Vol. 7, No. 4, October 1988, pages 249–292, or in the book "Numerical recipes in C. The Art of Scientific Computing", especially paragraph 4.1, by Press, William H. et al, edited by Cambridge University Press, 1988. Phase two can preferably be performed according to three similar implementations based on the same principle, i.e. preferably the reduction of the search range in the conversion table during execution of phase two, and preferably the selection of a new center value of the range during the second phase, if this new center value provides a smaller difference with respect to the target color than the former center value. Since the center point does not necessarily coincide with the geometric center point of the search range, it will further on be called pivot point or pivot value instead of center point or center value, respectively.

The preferred three implementations are:

a) a binary method guaranteeing convergence to the optimum solution, i.e. providing a desired minimum difference between the target color and the color produced by the color output device;

b) a modified binary method which reduces the search range only when it is the pivot point which produces a minimum difference value, also guaranteeing convergence to the optimum solution;

c) an incremental method similar to the modified binary method, but starting with a symmetrical range.

The present invention puts only minimal constraints on the values selected for each of the color image signals (e.g. the values do not have to be equidistant), thus allowing a reduction of the number of color samples needed to characterize the color gamut of a device, while maintaining a high level of accuracy. The color image signal values returned by the method and the apparatus of the present invention provide information on the location of the color belonging to the color gamut of the color output device and being closest or identical to the target color. Moreover, the method and apparatus preferably provide information about colors that cannot be reproduced by the device, i.e. which lie outside its color gamut. Color image signals including minimum or maximum values indicate that the color to be produced is located on the border of the color gamut of the color output device. In this case, the presence of a large color difference with the target color indicates that the target color is out of gamut and cannot be produced by the color output device. This information can also be stored in a conversion table to make it available for later use.

The objects of the present invention are achieved by means of a method and apparatus as defined in the claims.

Other objects, effects and functions of the present invention will become clear from the following description of the preferred embodiments with reference to the accompanying drawings.

BRIEF DESCRIPTION OF THE DRAWINGS

FIG. 2 is a representation of one-dimensional lookup tables containing values for color image signals A, B and C indexed respectively by k, l and m;

DETAILED DESCRIPTION OF THE PREFERRED EMBODIMENT OF THE INVENTION

Figure 1:
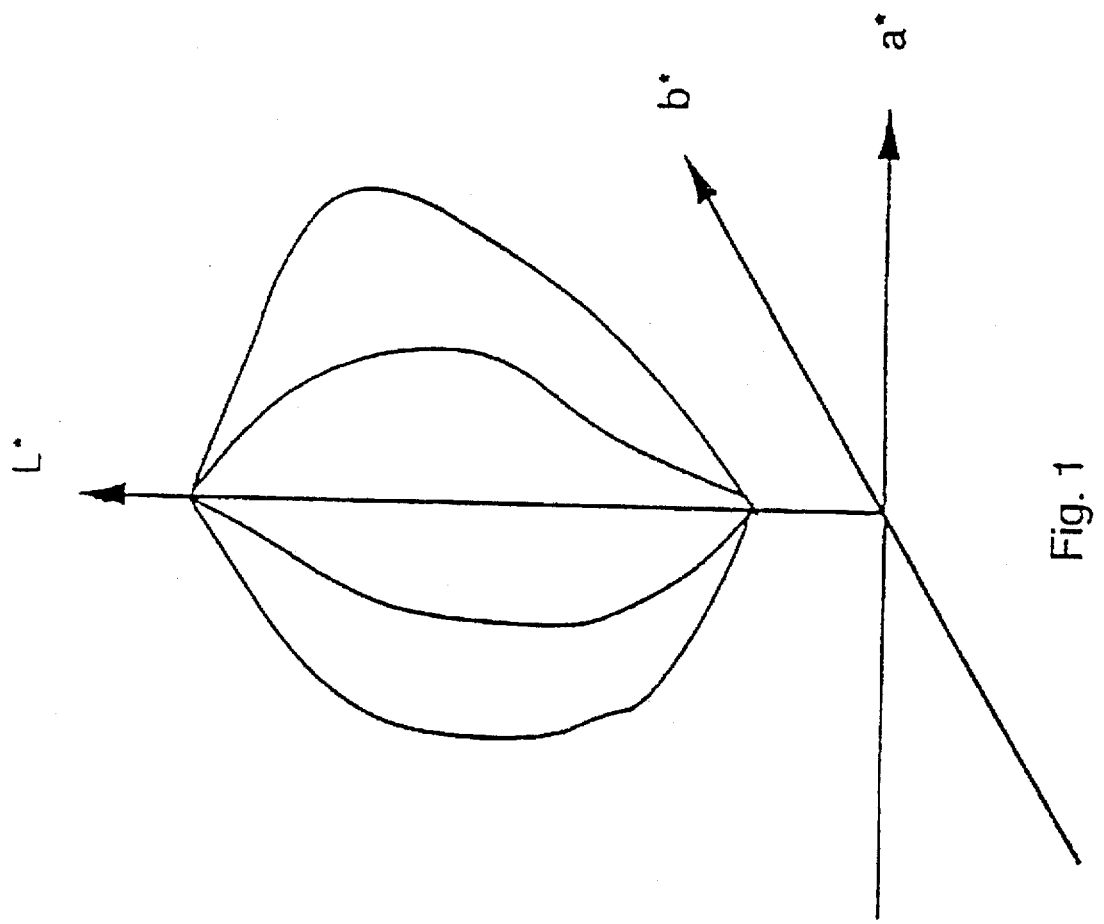
FIG. 1 is an illustration of the color reproduction range of a color output device in CIEL*a*b* coordinates.

FIG. 1 typically illustrates the range of color reproduction or color gamut of a color output device in device-independent CIEL*a*b* coordinates. Each color in this range is produced by a specific combination (triplet) of color image signal values represented by A, B, and C.

The relation between the L*a*b* values (triplet) and the color image signal triplets can be represented by the following equation:

$$(L^*, a^*, b^*)_i = f_{out}(A, B, C)_i \tag{1}$$

i=1, . . . , n being a natural number indicating a specific triplet.

In electronic color reproduction systems these color image signal values A, B and C will generate three or more color control signal values, e.g. RGB signals serving to convey values for each of the primary colors red (R), green (G), and blue (B) in additive color processing, or CMYK (Cyan, Magenta, Yellow and Black) signals used in substractive color reproduction systems.

Figure 10:
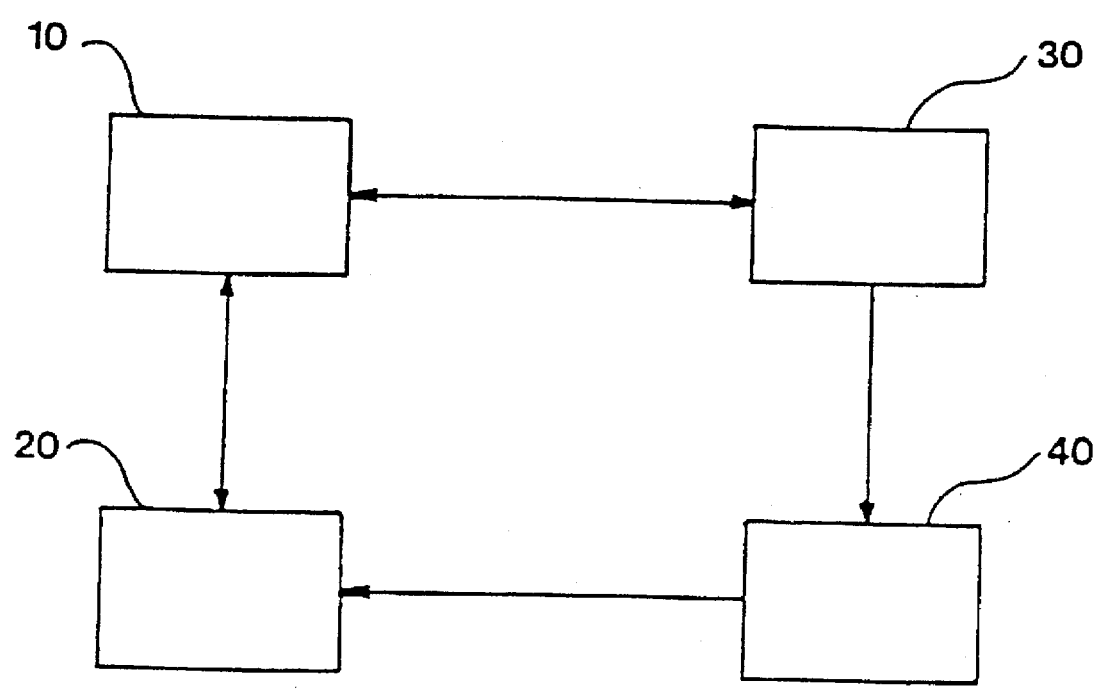
FIG. 10 illustrates a system of the present invention.

To characterize a color output device (30) as shown in FIG. 10, a multiplicity of combinations (triplets) of the three color image signal values A, B and C can be selected to produce test pages containing color samples which are preferably measured with a colorimeter (40) or a spectrophotometer outputting device-independent coordinate triplets. The L*a*b* triplet of the target color may preferably also be obtained by inputting an original image into a color input device (e.g. scanner) which outputs the device-independent coordinates of the colors of this image, if the color input device has been calibrated in order to provide device-independent color coordinates. Each measured CIEL*a*b* triplet has a corresponding ABC triplet, and this information is stored in a memory means (20) in the form of a conversion table (A, B, C; L*, a*, b*) representing the relation of equation (1). Using the method of the present invention a data processor means (10) determines on the basis of this conversion table the ABC triplet, with which a target color, specified by its L*a*b* coordinate triplet, can be reproduced by the color output device. This ABC triplet is used by control means of said color output device to control the generation by the color output device of a color identical or closest to the target color. The data processor means (10) may preferably contain the control means of said color output device. The data processor means (10) and/or the memory means (20) may preferably be included in the color output device.

The present invention can be preferably applied in two cases. The first case occurs when a single or very few target L*a*b* triplets (corresponding to specific target colors), which are not available as such in the conversion table, have to be found together with its or their corresponding color image signal values. The second case occurs when frequently for a large number of target L*a*b* triplets, which are not available as such in the conversion table, the corresponding color image signal values have to be found.

Each given target device-independent coordinate triplet and the corresponding device-dependent color image signal triplet, determined by the method of the present invention, may preferably be stored in memory means in the form of a conversion table, respectively as input and output triplets. Such an inverted table may preferably be stored in the memory of the color output device. With such a conversion table, the processing means of the color output device can easily transform any target device-independent coordinate triplet, e.g. by tri-linear interpolation, into the device-dependent color image signal values, which are used by control or drive means to control the generation of color in the color output device. With this table a transformation is established from CIEL*a*b* values into ABC color image signal triplets.

$$(A, B, C)_i = f_{olay}(L^*, a^*, b^*)_i \qquad (2)$$

i having the same meaning as in equation (1).

The different locations in the conversion table contain the values of the color image signal triplet and are addressed by the L*a*b* coordinates. For ease of use and fast access it is preferable to select equidistant values for the L*a*b* entry points of the table, the number of which define how large the table and how accurate the results of interpolated values will be. The original or first and the inverted conversion table may also be constructed from other device-independent coordinates, e.g. LCH coordinates (Luminance, Chroma, Hue). For this it is sufficient to have a transformation from the LCH triplets to CIEL*a*b* coordinate triplet to be able to use the present invention. The apparatus of the present invention may advantageously include means for performing this transformation. In a similar way, a conversion table from device-dependent color image signals from a color input device (e.g. a scanner) to color image signals controlling a color output device can be constructed, provided the device-dependent input signals can be transformed into CIEL*a*b* coordinates (e.g. by calibrating the color input device).

In a similar way, if given device-dependent color signal values of a color input device have been transformed into device-independent coordinates, the present invention can be used to determine the color image signal values by which the color output device can produce a color identical or closest to the target color which has been input in the color input device and which corresponds to these given device-dependent values.

The apparatus of the present invention may preferably provide information on the color gamut of the output device, and in particular, about L*a*b* triplets which cannot be reproduced. For such out-of-gamut colors the method will return the color image signal triplets ABC corresponding to a color on the border of the color gamut closest to the out-of-gamut color, and the color difference value ΔE provides information about the distance between the target color and the reproduced color.

The first conversion table stored in the memory means contains the measured L*a*b* triplet of the color samples and the corresponding color image signal triplets ABC with which these L*a*b* triplets can be produced when the color image signals are applied to the processing means of a color output device. To provide an efficient access method to the stored data a three-dimensional structure is preferred. Each axis of this structure is respectively defined by the values selected for the color image signals A, B and C.

Figure 3:
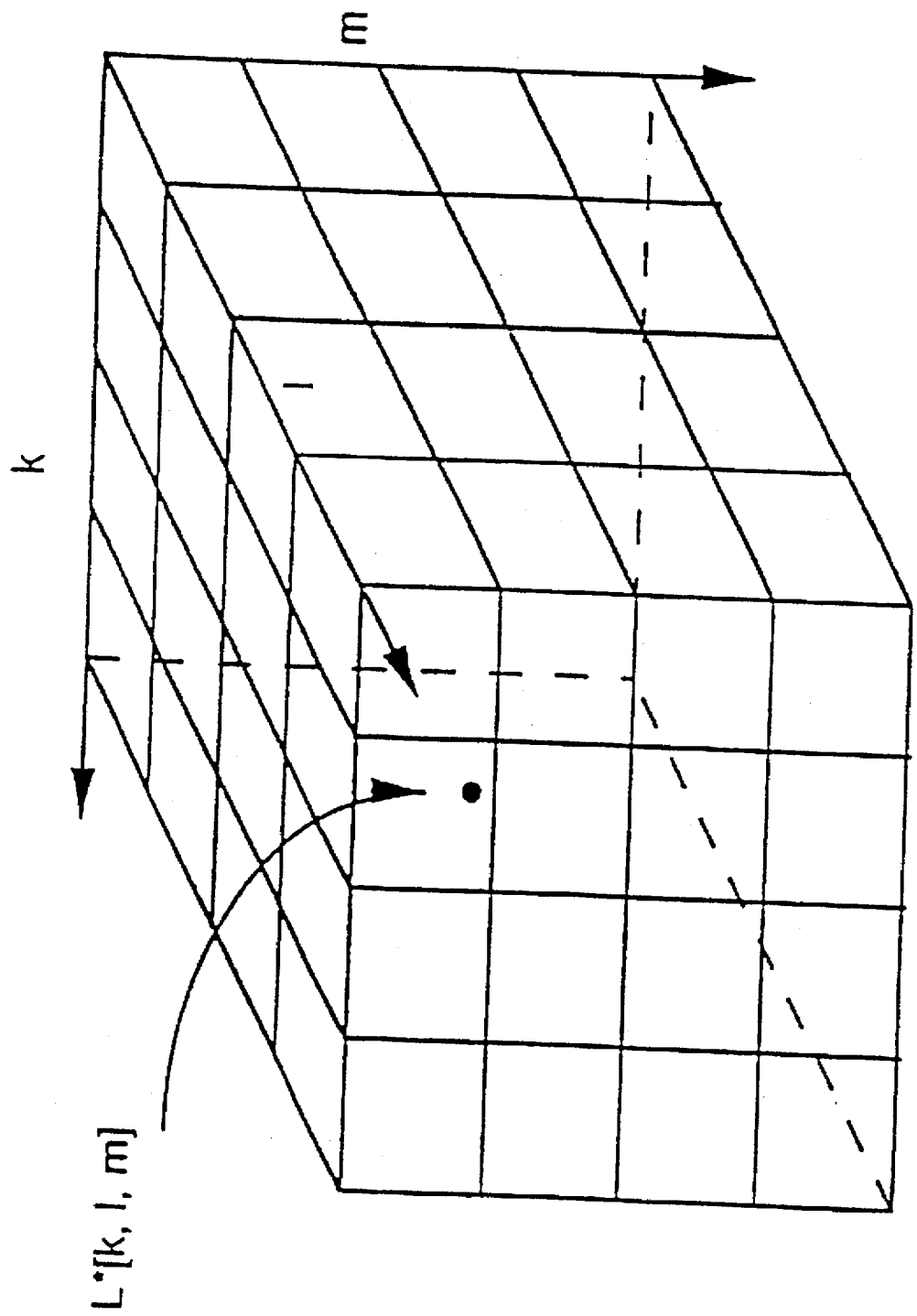
FIG. 3 is a representation of a three-dimensional lookup table containing L* values indexed by k, l and m.

One-dimensional lookup tables may preferably be used to store the respective values A, B and C, thus increasing the flexibility in the selection of color image signal values for the production of color samples. The values for A, B and C are stored in the respective lookup tables and indexed respectively by k, l, m as shown in FIG. 2. Each selected value of A, B, C is thus uniquely defined by its index value, respectively k, l and m. The use of one-dimensional lookup tables for the respective values A, B and C offers a high degree of flexibility with A, B and C being independent from each other. For example, the distance between two consecutive A values may be different from the distance between two consecutive B values (or C values). It is also possible to have a different number of values for A, B and C. This would mean that the ABC three-dimensional structure is not necessarily a cube but could be a cuboid. Each color sample produced by an ABC triplet can preferably also be referenced by the corresponding values of the k, l, and m indexes. This allows storage of the corresponding measured values of the L*a*b* triplet of each color sample in three-dimensional structures addressed by the same k, l, m indexes (as shown in FIG. 3), since the values of a L*a*b* triplet corresponds with an ABC triplet. Any combination of k, l, m values can be used to locate the values of the color image signals A, B and C in the one-dimensional lookup tables shown in FIG. 2 and the corresponding measured L*a*b* triplets in the three-dimensional structure shown in FIG. 3.

The goal of the preferred embodiment is to find the L*a*b* triplet and, hence, the corresponding device-dependent ABC triplet, which will produce the smallest ΔE color difference value between the CIEL*a*b* coordinates of the target color and the CIEL*a*b* coordinates of the closest color which the device can produce.

ΔE is defined by the following equation:

$$\Delta E = \sqrt{r\Delta L^{*2} + s\Delta a^{*2} + t\Delta b^{*2}} \quad (3)$$

with

ΔL*=L*target−L*search

Δa*=a*target−a*search

Δb*=b*target−b*search

ΔL, Δa and Δb represent the difference between the CIEL*a*b* coordinates of the target color and the L*a*b* values generated by the method. The parameters r, s and t are weighting values and can have the value of one or any other value and may have the same or a different value. If the parameters r, s and t all have the value of one, the equation (3) then represents the official CIE ΔE definition.

The method of the present invention follows preferably a two-phase approach to determine the A, B, C values which will produce the desired minimum ΔE. During the first phase the method uses only the data stored in the conversion table to locate a stored ABC triplet (pivot point or pivot value) producing a first smallest ΔE. In this first phase no interpolation is used to calculate additional data values. During the second phase a small range around the pivot point, i.e. the above mentioned stored ABC triplet found in phase one, is sampled and the result obtained by tri-linear interpolation or any other appropriate interpolation is used in further steps (explained in detail further on) leading to the desired minimum value of ΔE.

The aim of phase one is to locate in the conversion table the stored device-independent coordinate triplet of the color sample which has the smallest color difference ΔE value with respect to the CIEL*a*b* color coordinates of the target color. This is preferably achieved by sequentially selecting all combinations of the k, l, m indexes, and for each combination using the corresponding L*a*b* triplet from the three-dimensional structure to calculate the color difference ΔE with the target color L*a*b* triplet. At the start of phase one, for the first k, l, m combination, the ΔE value is calculated and is stored in memory means. Each following new ΔE of other k, l, m combinations is compared with the previously stored ΔE value. If the new ΔE value is smaller than the stored ΔE value, the stored value of the minimum ΔE will be updated to this new ΔE value together with the new corresponding values of the k, l and m indexes. At the end of this sequence the last stored index values ks, ls, ms will point to the values of the color image signal coordinate triplet Ac, Bc, and Cc corresponding to the color sample having the smallest color difference ΔE with the target color, i.e. between their respective CIEL*a*b* triplets. The Ac, Bc and Cc are used as pivot point in phase two, if phase two is executed.

Phase two is started by defining a set of new ABC triplets in a specific range surrounding the pivot triplet found in phase one. The locations of these new ABC triplets depend on the search range selected in the ABC space as will be explained hereafter. For these new ABC triplets the corresponding triplets of L*, a* and b* values are calculated by interpolation, e.g. by tri-linear interpolation, and for each ABC triplet and corresponding calculated L*a*b* triplet the ΔE with the target color is determined. The ABC triplet of this set producing the device-independent L*a*b* triplet having the smallest ΔE will then preferably be used as a new pivot triplet to define again a new set of A, B, C triplets around this new pivot triplet. If two or more L*a*b* triplets produce the same smallest ΔE, then either one of these triplets is taken as the pivot point and is then maintained as such, or the first triplet of these triplets which provides the smallest ΔE is taken as the new pivot point. The procedure of phase two described above can then preferably be repeated until the ABC triplet and the corresponding L*a*b* triplet with the desired minimum ΔE are found. Phase two can preferably be implemented in three different ways. In the following description the method applied in a three-dimensional structure (ABC space) will be explained by means of two-dimensional examples for ease of representation (FIGS. 5–9).

a. Binary method

The ks, ls, ms values resulting from phase one refer to color image signal values which can be found in the one-dimensional lookup tables shown in FIG. 2. These color image signal values corresponding with ks, ls and ms will be named Ac, Bc, and Cc, respectively, i.e. the pivot triplet Ac, Bc, Cc.

Figure 4:
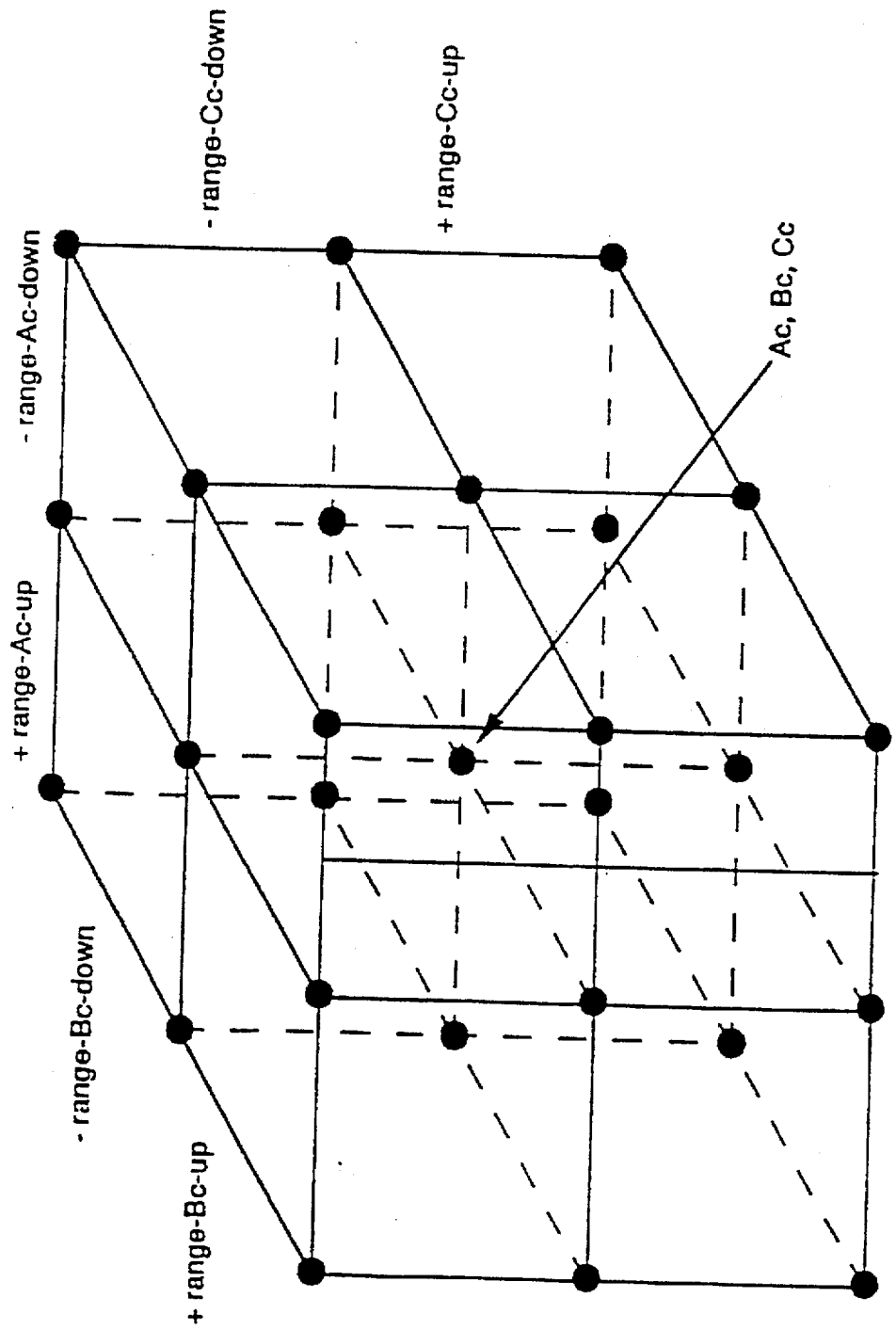
FIG. 4 is an illustration of a pivot point surrounded by 26 points located on a three-dimensional cuboid shape.

Six range or increment values are defined referring to up and down directions, i.e. the respective A, B and C axis in the three-dimensional ABC structure (range-Ac-up, range-Ac-down, range-Bc-up, range-Bc-down, range-Cc-up and range-Cc-down) thus defining two additional points on each A, B and C axis. With these six ranges 26 new points, i.e. 26 new ABC triplets, can be located around the pivot triplet Ac, Bc, Cc on a cuboid shape as shown in FIG. 4.

The values for these ranges can be fixed or can be a function of the Ac, Bc and Cc values. There are many possibilities to implement such a function. The examples described below illustrate how the ranges can be derived from the Ac, Bc and Cc values. Given the values of Ac, Bc and Cc, the differences with respect to the respective values located just above and below in the one-dimensional lookup tables of FIG. 2 are calculated and these differences, or a somewhat smaller value (e.g. 80%) or the closest binary value (e.g. 2, 4, 8, 16, 32, ... ), are used as the initial values of the ranges. A very flexible way to define these ranges is, for example, to use one-dimensional lookup tables, similar to those shown in FIG. 2, indexed by k, l and m to store the preferred selected range values.

Figure 5:
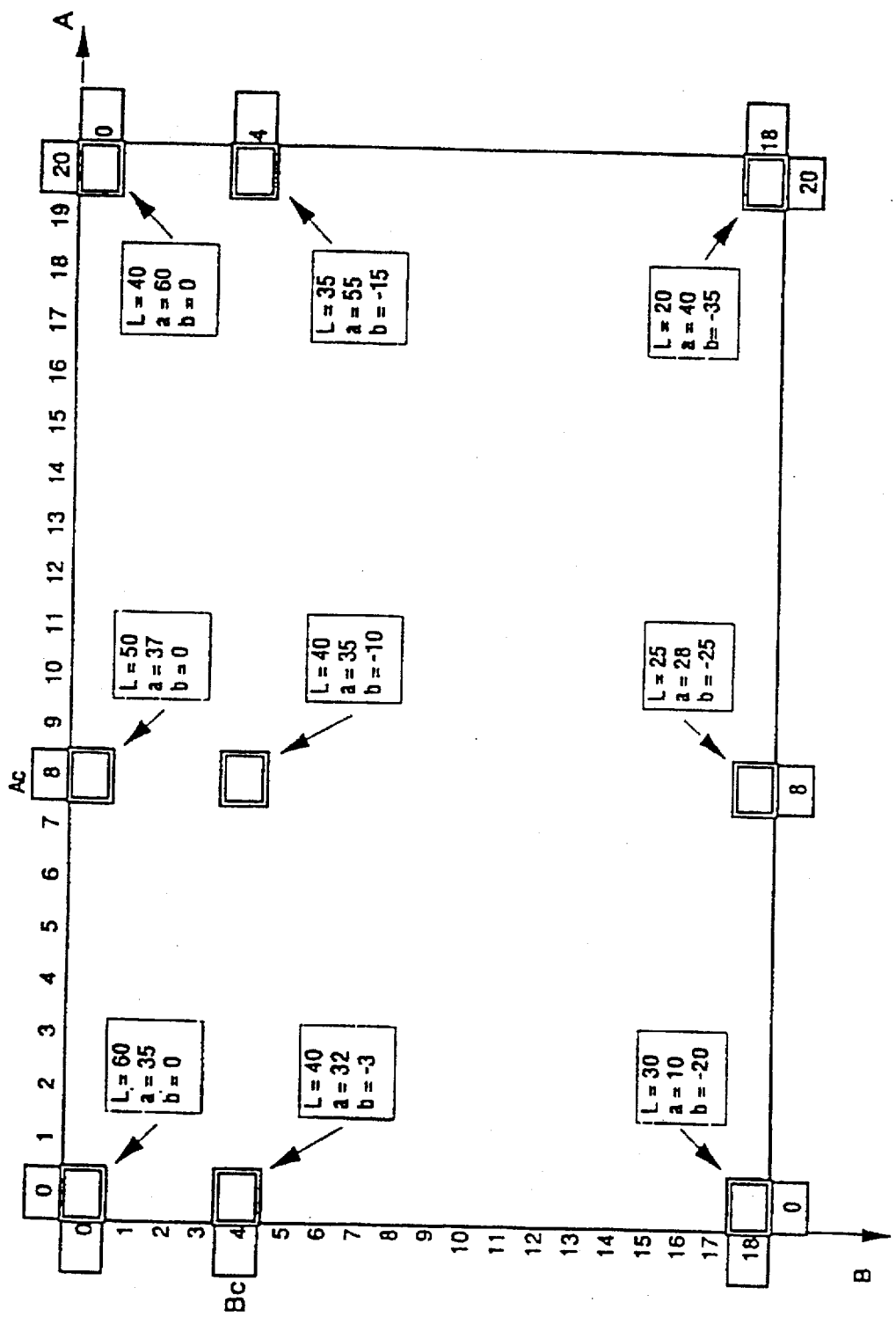
FIG. 5 is an illustration of the data layout of a two-dimensional example belonging to the three-dimensional color space.
Figure 6:
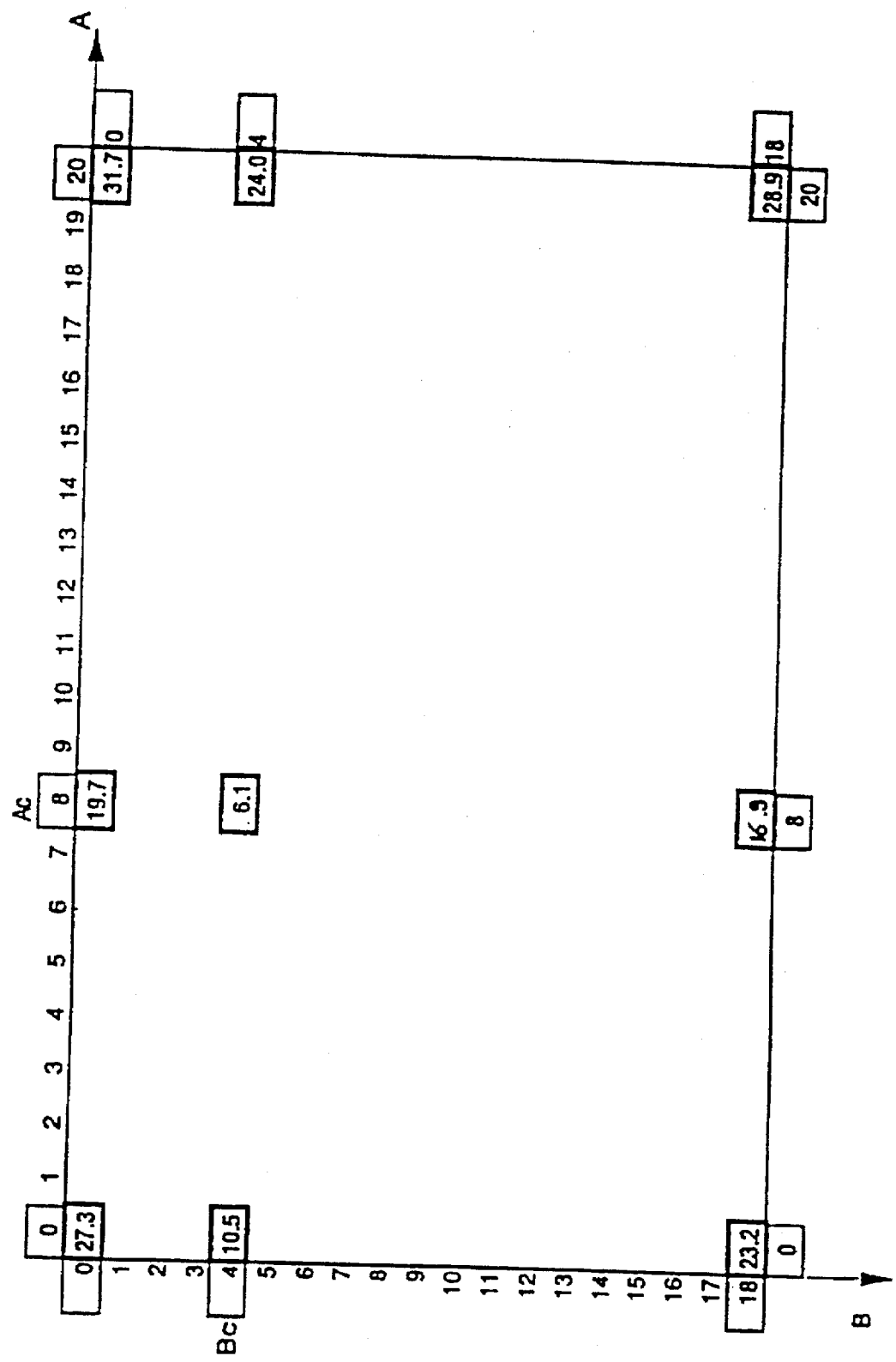
FIG. 6 is an illustration of the $\Delta E$ results in the two-dimensional example of FIG. 5.

With the target CIEL*a*b* triplet chosen in this example (L*=36,1; a*=31,2; b*=−12,7), phase one resulted in the pivot point Ac=8 and Bc=4. The two-dimensional diagram in FIG. 5 shows a part of the A and B axes and the selected values of A (0, 8, 20) and B (0, 4, 18) that where used to produce color samples. The measured L*, a*, b* triplets of the nine (27 in the three-dimensional ABC structure) color samples are also indicated. FIG. 6 shows the ΔE values of these nine color samples. For the value Ac=8 the values 0 and 20 are the values respectively just above and below Ac. In the example below, for the first iteration, the difference between Ac and the respective values just above and below are halved to define the respective up and down increments in the up and down A direction, e.g. range-Ac-up and range-Ac-down. The same is done for B (0, 4, 18). As already mentioned, FIG. 5 and 6 show only the two-dimensional part of the example. It is obvious that for the C direction a similar process is used since, in reality, the triplet values A, B and C of the ABC space are used.

The 26 new points located on the sides of the cuboid will have coordinates which usually do not coincide with the respective values in the A, B and C look up tables (for example, they will be at any location in FIG. 5 except at the nine with known CIEL*a*b* values). For each of these 26 ABC triplets the corresponding L*a*b* triplets can be calculated by tri-linear or any other known method of interpolation.

and b* values of these four L*a*b* triplets are multiplied with the respective coefficient as shown in the following table. The results of the calculation have been rounded off to three digits after the comma.

| Location | | | | L*x | | a*x | | b*x | |
|---|---|---|---|---|---|---|---|---|---|
| A | B | Coefficient | L* | Coef | a* | Coef | b* | | Coef |
| 0 | 4 | (1 − u)x(1 − v) 0,071 | 40 | 2,857 | 32 | 2,286 | −3 | | −0,214 |
| 8 | 4 | u x(1 − v) 0,500 | 40 | 20,000 | 35 | 17,500 | −10 | | −5,000 |
| 0 | 18 | (1 − u)x v 0,054 | 30 | 1,607 | 10 | 0,536 | −20 | | −1,071 |
| 8 | 18 | u x v 0,375 | 25 | 9,375 | 28 | 10,500 | −25 | | −9,375 |
| Sum | | | | 33,839 | | 30,821 | | | −15,661 |
| Target L*a*b* | | | | 36,1 | | 31,2 | | | −12,7 |
| Δ | | | | 2,261 | | 0,379 | | | 2,961 |
| Δ² | | | | 5,111 | | 0,143 | | | 8,766 |
| ΔL*² + Δa*² + Δb*² = ΔE² | | | | 14,02 | | | | | |
| ΔE | | | | 3,744 | | | | | |

The following equations are used in tri-linear interpolation:

The triplets ABC are the coordinates of the eight neighboring points.

| A | B | C | Coefficients | | |
|---|---|---|---|---|---|
| Low | Low | Low | (1 − u) | x (1 − v) | x (1 − w) |
| High | Low | Low | u | x (1 − v) | x (1 − w) |
| Low | High | Low | (1 − u) | x v | x (1 − w) |
| High | High | Low | u | x v | x (1 − w) |
| Low | Low | High | (1 − u) | x (1 − v) | x w |
| High | Low | High | u | x (1 − v) | x w |
| Low | High | High | (1 − u) | x v | x w |
| High | High | High | u | x v | x w |

Since the ABC space is a three-dimensional space, eight ($2^3$) coefficients are necessary. Each of these eight coefficients are multiplied with the L*a*b* triplet of one of the respective eight ABC triplets neighboring the ABC triplet of which the L*a*b* triplet values have to be calculated. The u, v and w values represent the ratio of the location of the respective A, B and C values of that ABC triplet with respect to the respective A, B and C values of the selected neighboring points on the A, B and C axis, respectively. The ratio is calculated for each axis by dividing the projected distance between the ABC triplet and its lower neighbor by the projected distance between the higher and the lower neighbor for each respective axis.

The example herebelow illustrates the interpolation in a two dimensional structure for case of representation. This means that instead of eight there are four ($2^2$) coefficients to be calculated. The interpolation example aims at finding the L*a*b* triplet with the corresponding ΔE for the point (A, B)=(7,10) depicted in FIG. 7b. The neighboring points on the A axis are 0 and 8, whereas the neighboring points on the B axis are 4 and 18, hence forming the pairs (0, 4), (8, 4), (0, 18) and (8, 18) for each of which the respective coefficients are calculated as shown in the table below. The u value is (7-0)/(8-0)=0,875 and the v value is (10-4)/(18-4)=0,429. The table also shows the L*, a* and b* values for each of the four pairs. These L*a*b* triplets are all known from the first conversion table mentioned above. The L*, a*

The respective sums represent respectively the L*=33, 839; a*=30,821 and b*=−15,661 of the pair (A, B)=(7, 10).

The value Δ represents the difference between each of the sums and the respective target L*, a* and b* values.

The L*, a*, b* values obtained by interpolation are then used to calculate the color difference ΔE with the L*a*b* triplet of the target color. The ΔE results of the 27 triplets, i.e. the 26 new ones and the pivot triplet, are compared with each other and the point giving the smallest ΔE is selected as the new pivot triplet.

The coordinates of this new location (pivot point) are now named Ac, Bc, Cc and the process described above is restarted with smaller ranges (i.e. smaller increments); e.g. $increment_{i+1}=r \times increment_i$, where r<1 (if desired, a different r value may be used for every range and for every iteration) and i being a natural number indicating which iteration the range is belonging to.

This process can be repeated until a ΔE value is found which is smaller than a pre-defined minimum or until the ranges become zero. This condition presents a problem in three-dimensional structures because the different ranges will decrease in a different way and one range will probably become zero or reach its predefined minimum before the others do (see example below). In that case the process must not be stopped since the minimum ΔE may not have been found yet.

In the preferred example given here below the ranges will not be reduced to zero, but will be maintained at a minimum value of one. The processing will preferably be stopped when a ΔE value is found smaller than the predetermined minimum or when all three ranges (in the A, B and C direction, respectively) are reduced to one and the smallest ΔE is provided by the pivot point.

FIG. 7 shows the sequence of events when the binary method described above is used with the data in the two-dimensional example. FIG. 7a shows the results of the first iteration starting from the pivot location Ac=8, Bc=4 and the eight points obtained with the ranges:

range-Ac-down=4, range-Ac-up=6 range-Bc-down=2, range-Bc-up=7

Range-Ac-down is found by (8-0)/2; range-Ac-up is (20-8)/2; range-Bc-down is (4-0)/2; range-Bc-up is (18-4)/2.

Figure 7A:
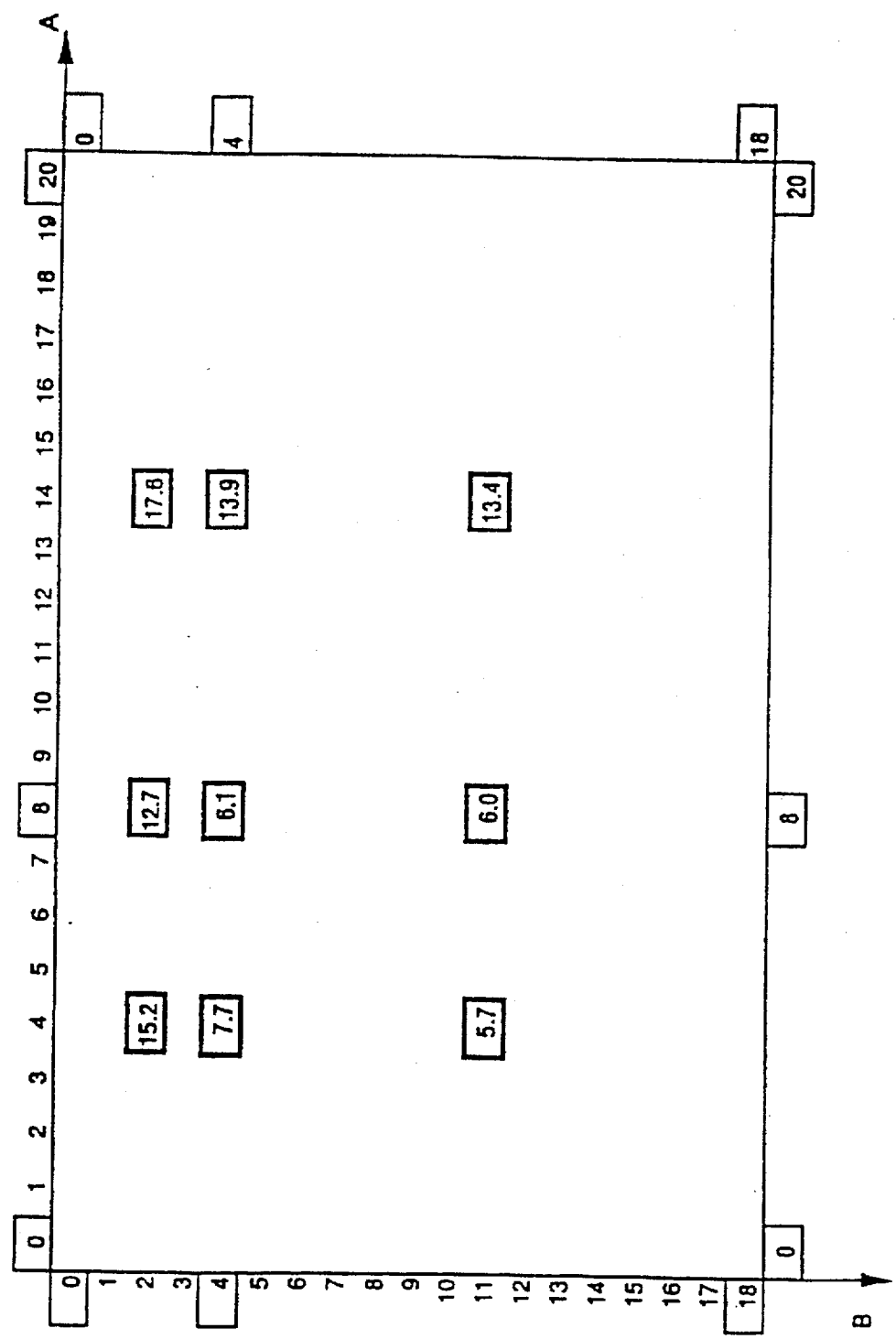
FIGS. 7a–7d show the $\Delta E$ results for each iteration of the binary method of the present invention.
Figure 7B:
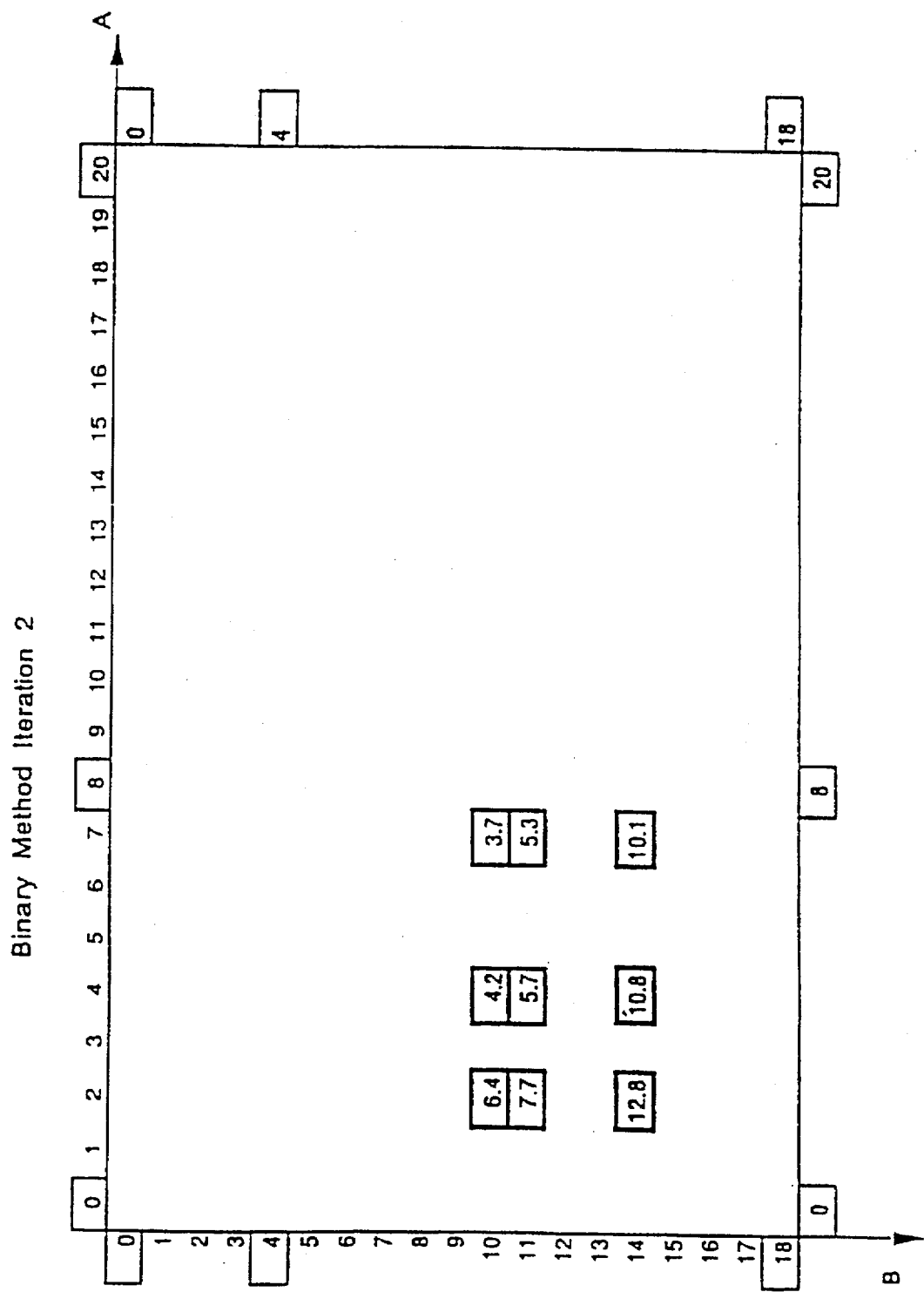

For the second iteration the point (or location) with ΔE=5.7 (A=4, B=11) is selected as new pivot point since this is the smallest ΔE provided by this set of 9 points (or 27 in the three-dimensional ABC structure). The ranges are, for example, reduced to respectively 2, 3, 1 and 3 by dividing the previous ranges by two and rounding off to the lower integer. The result is shown in FIG. 7b.

Figure 7C:
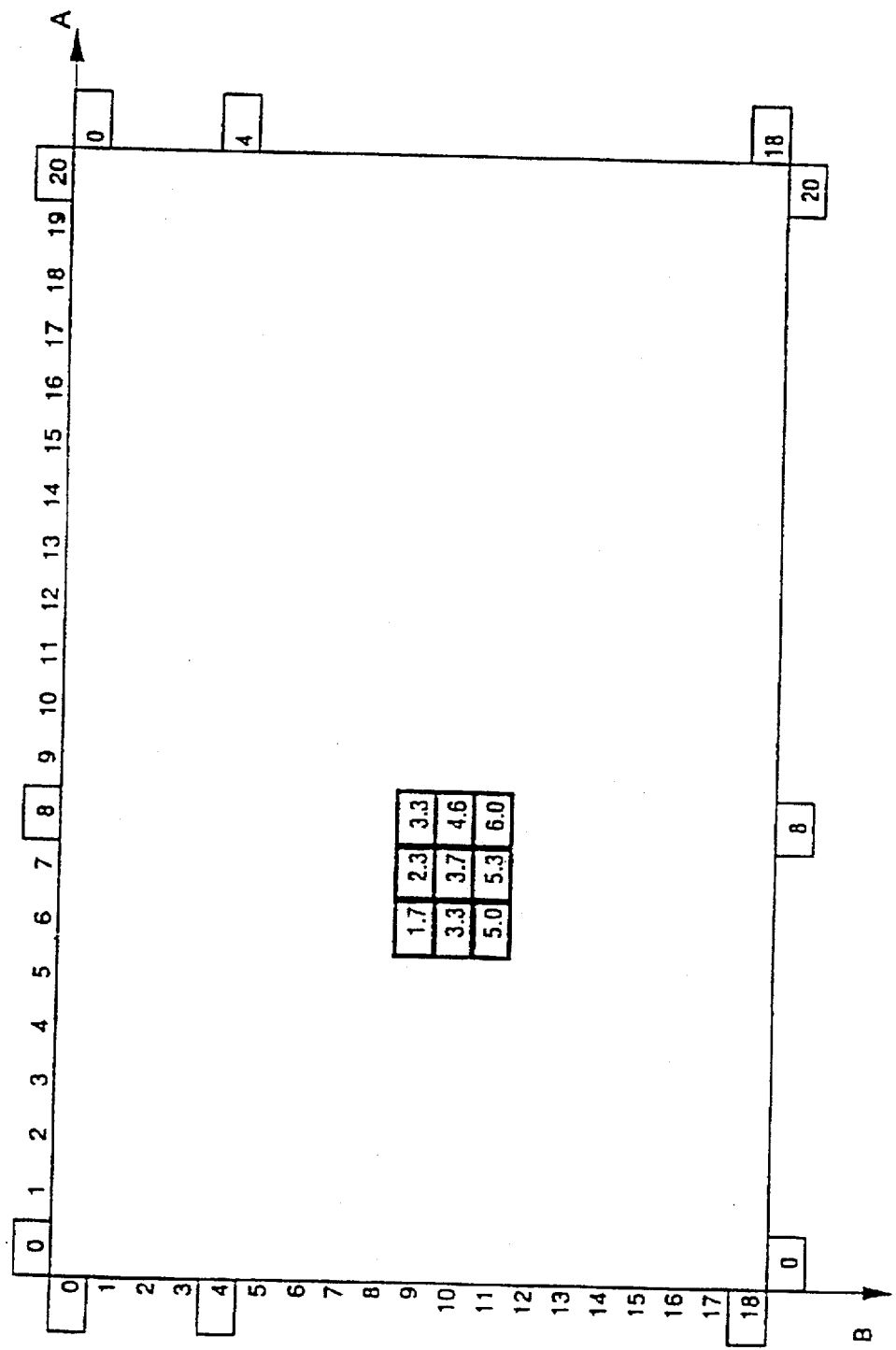

For the third iteration the point with ΔE=3.7 (A=7, B=10) is selected as new pivot point and the ranges are reduced to respectively 1, 1, 1 and 1. As explained previously, the range-Bc-down which had a value of one is not reduced to zero but is maintained at one. This allows the method to be continued in the B-down direction, too. The result is shown in FIG. 7c.

Figure 7D:
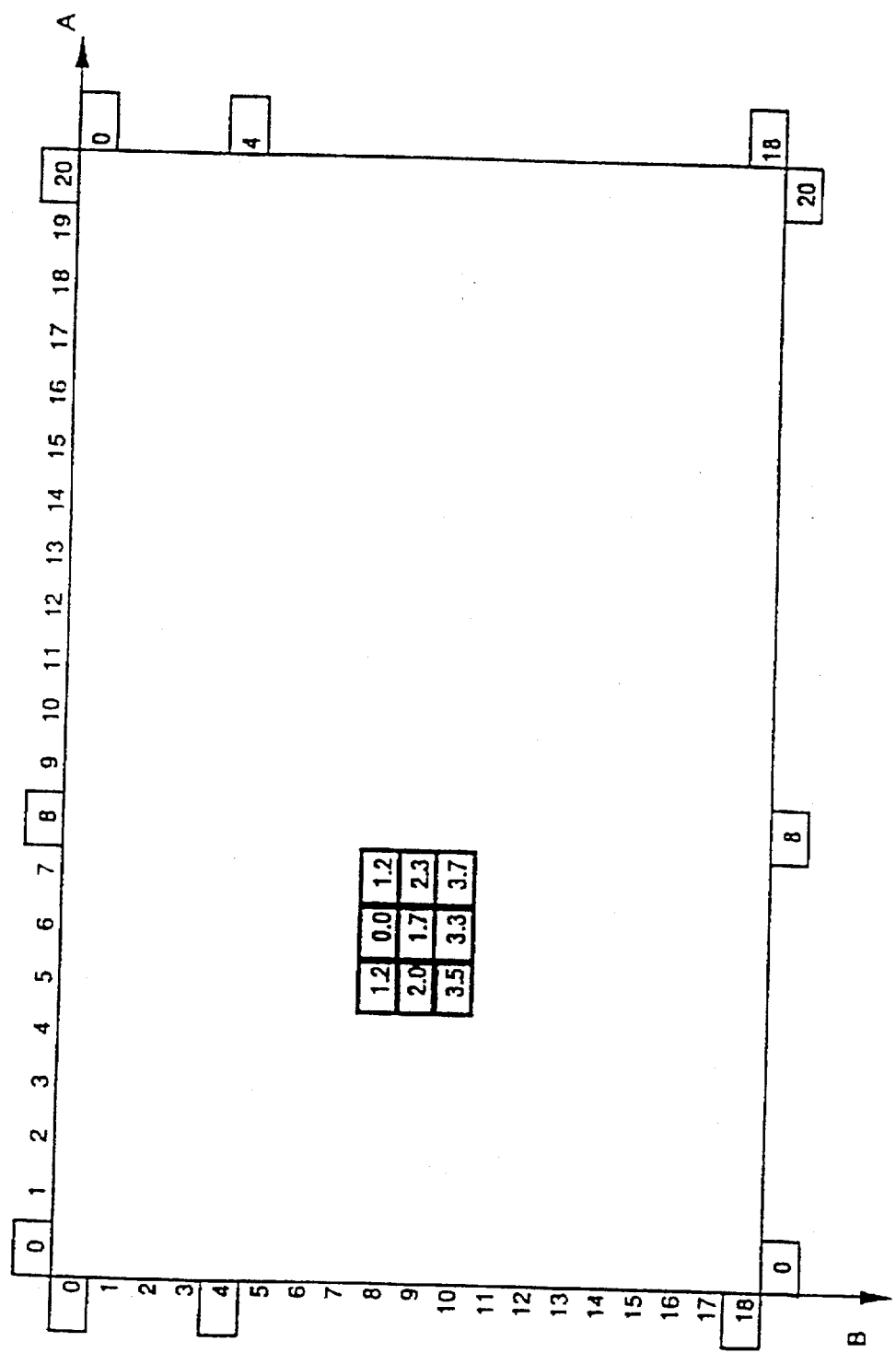
Figure 8A:
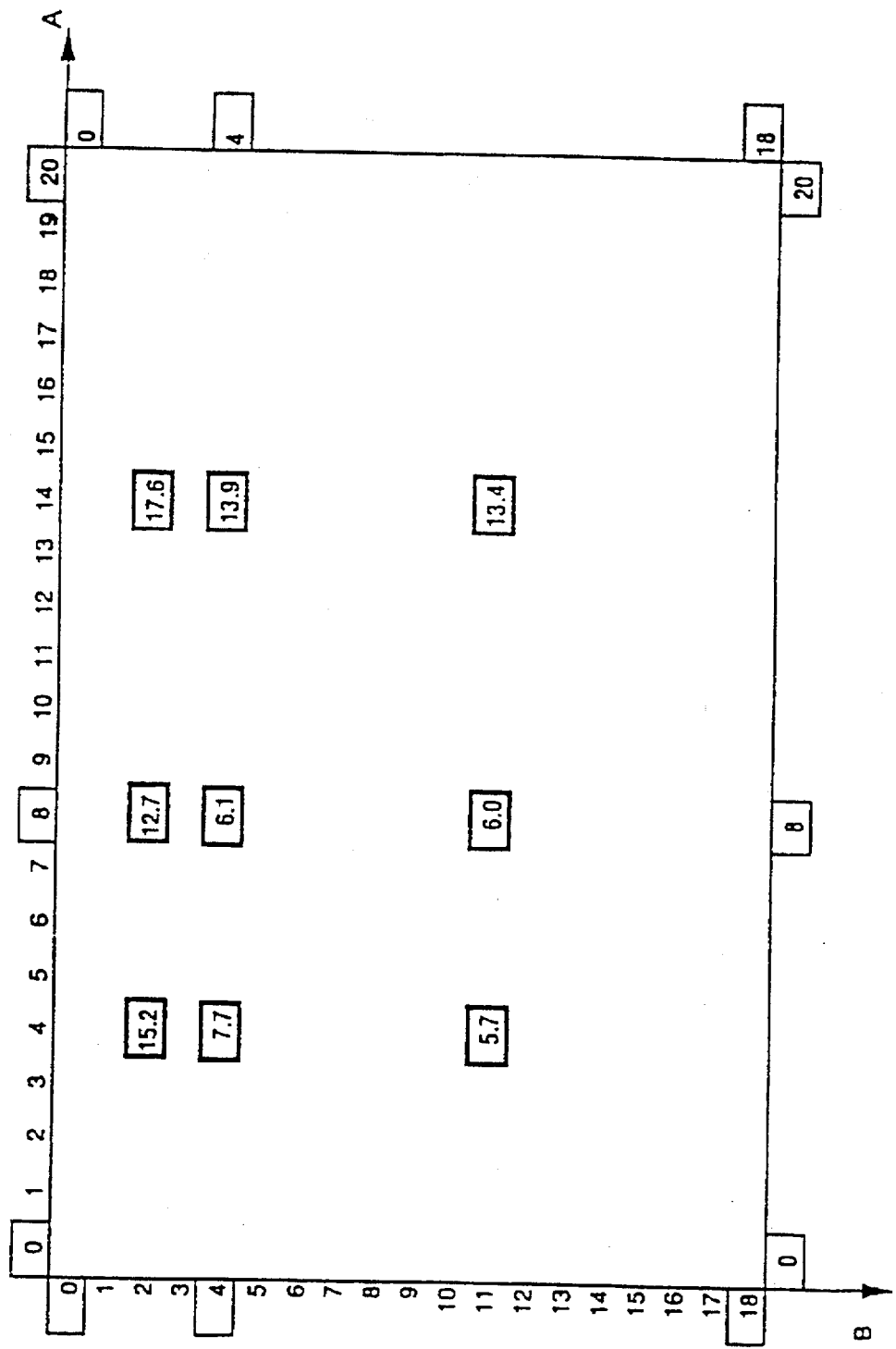
FIGS. 8a–8f show the $\Delta E$ results for each iteration of the modified binary method of the present invention.
Figure 8B:
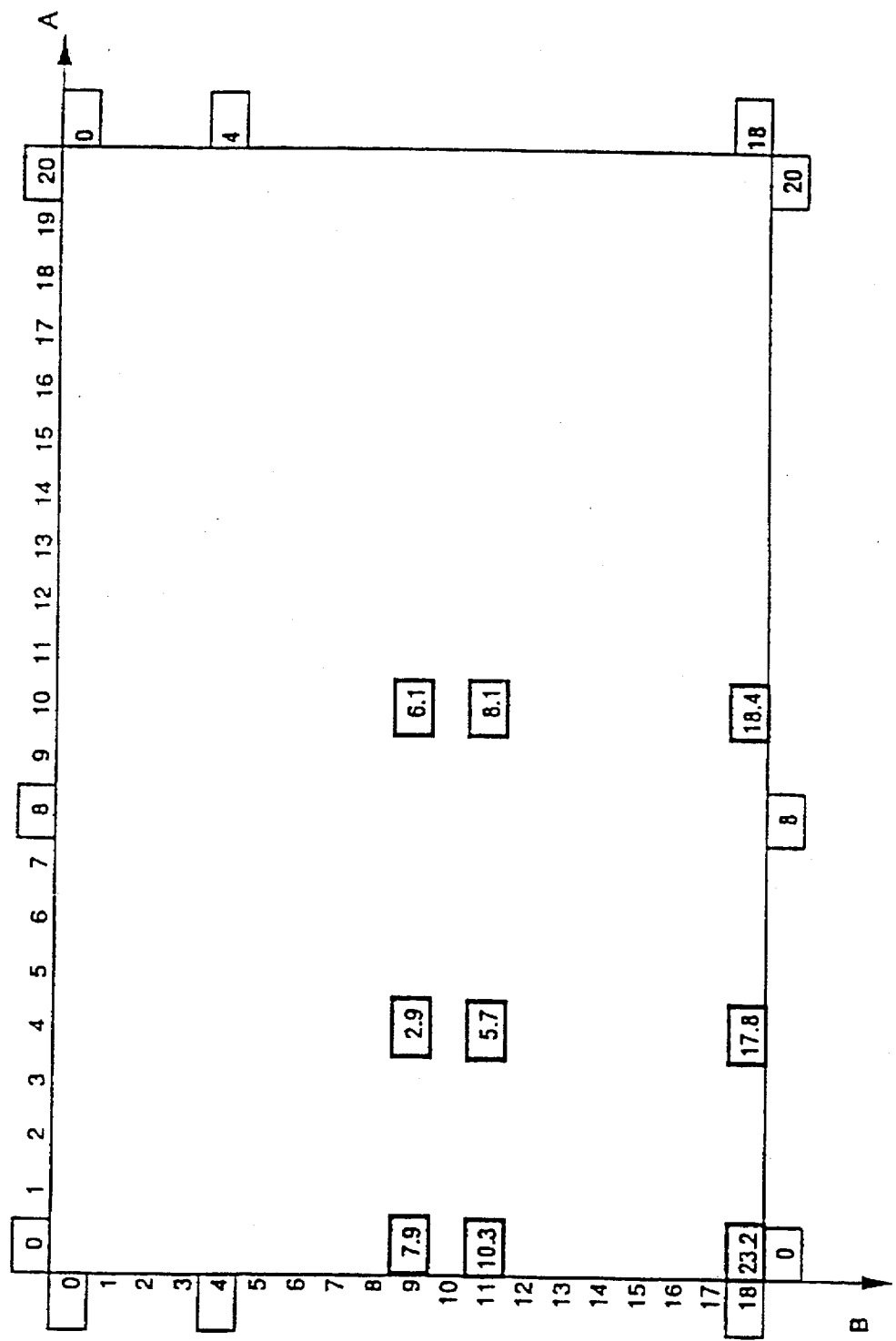
Figure 8C:
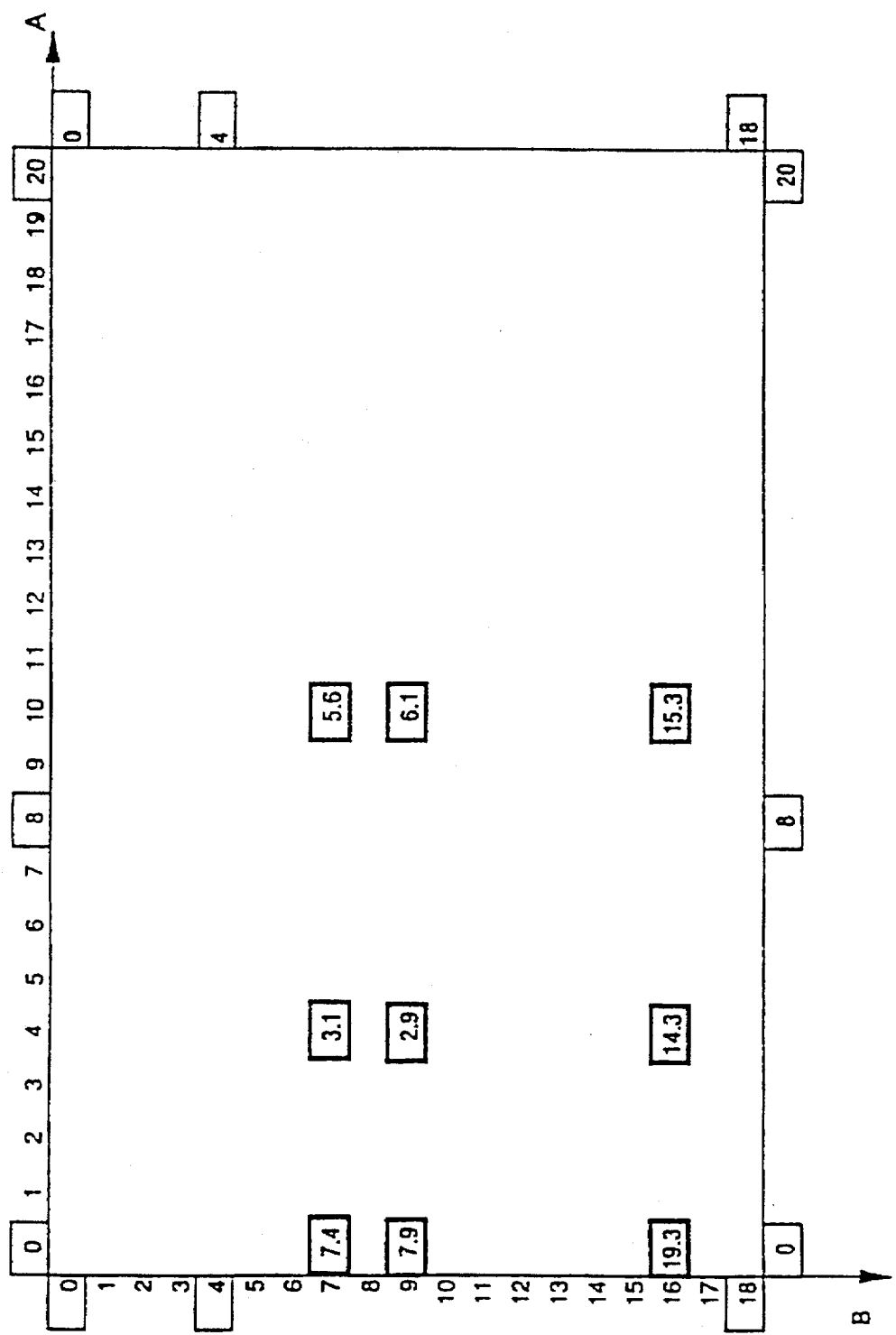
Figure 8D:
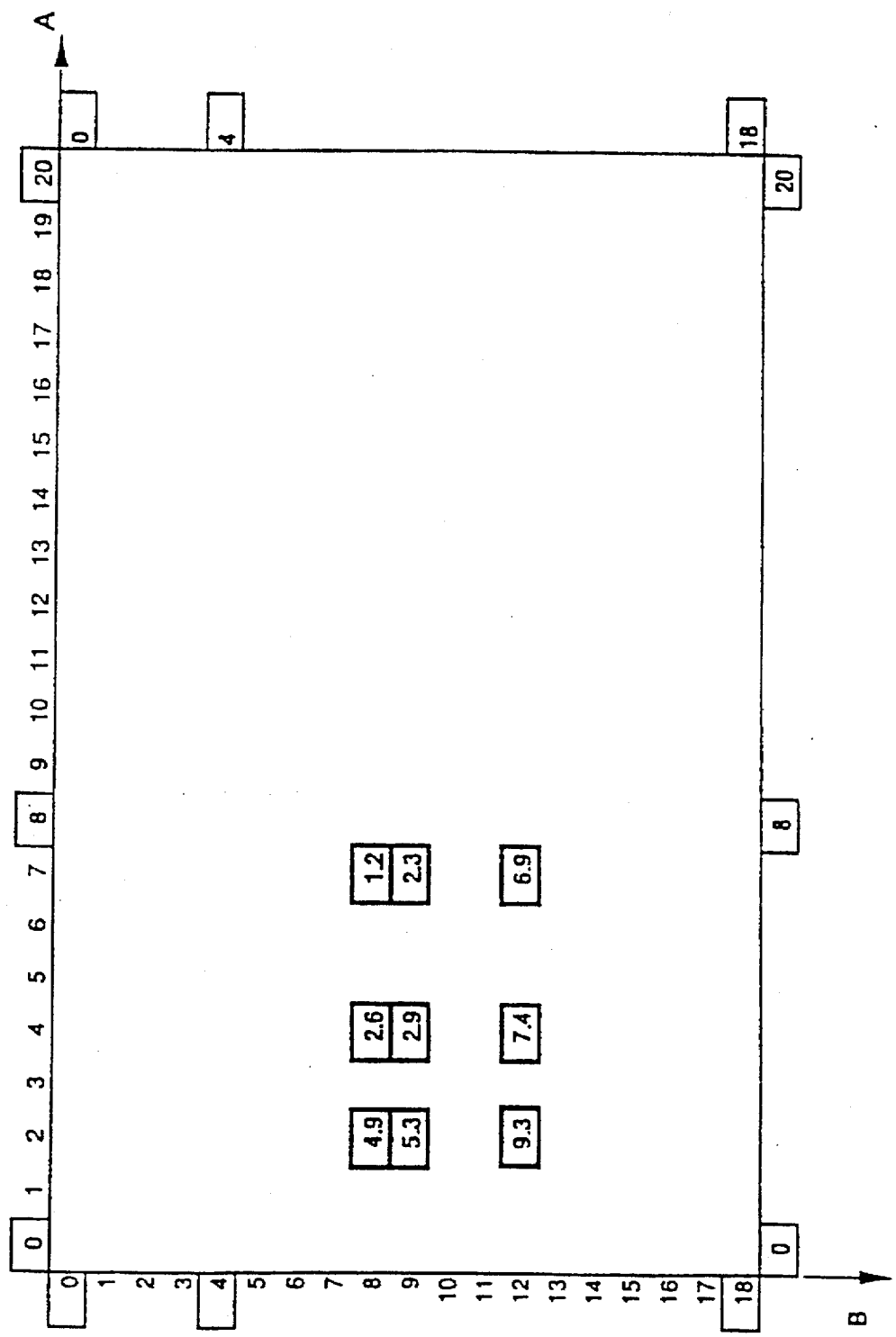
Figure 8E:
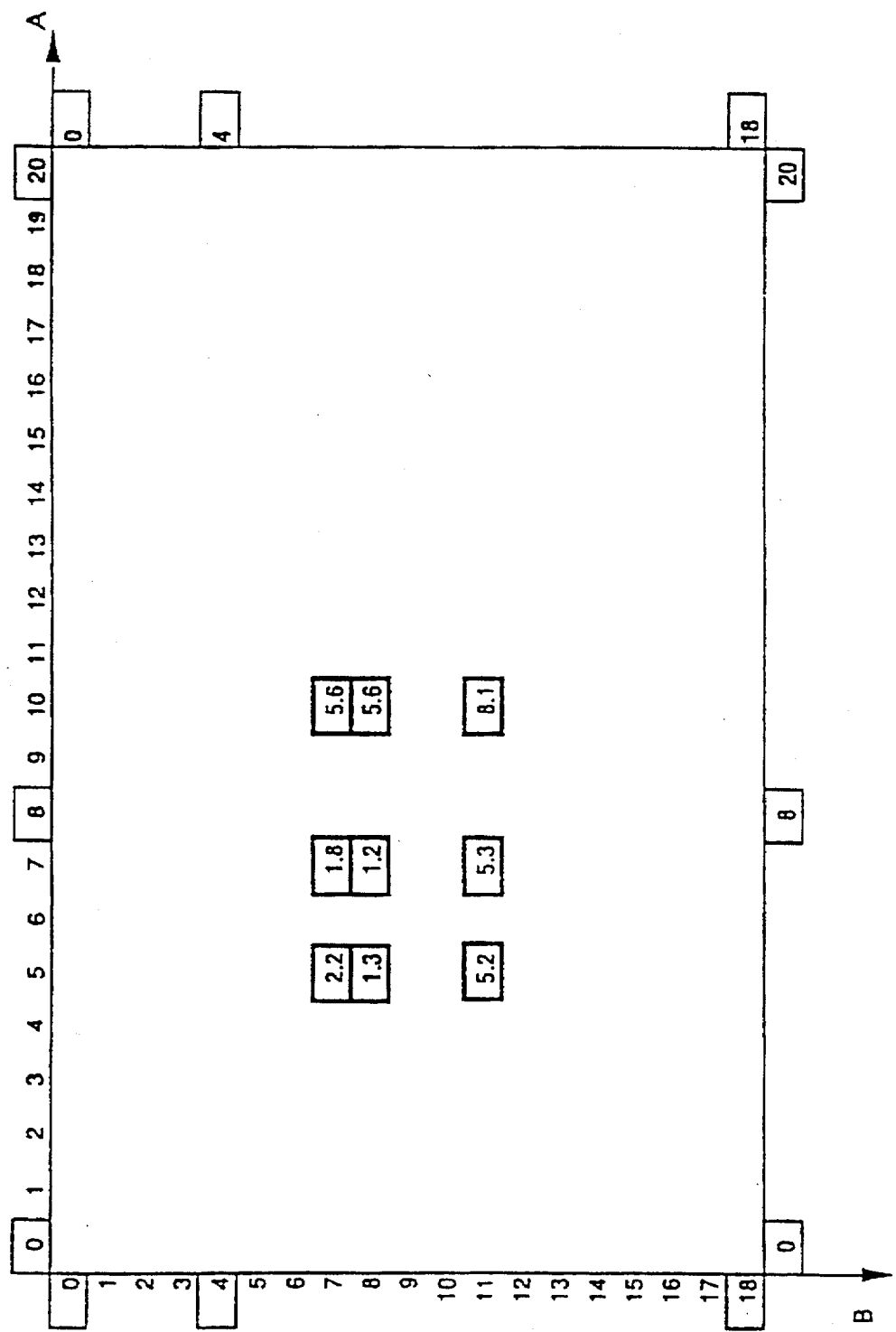
Figure 8F:
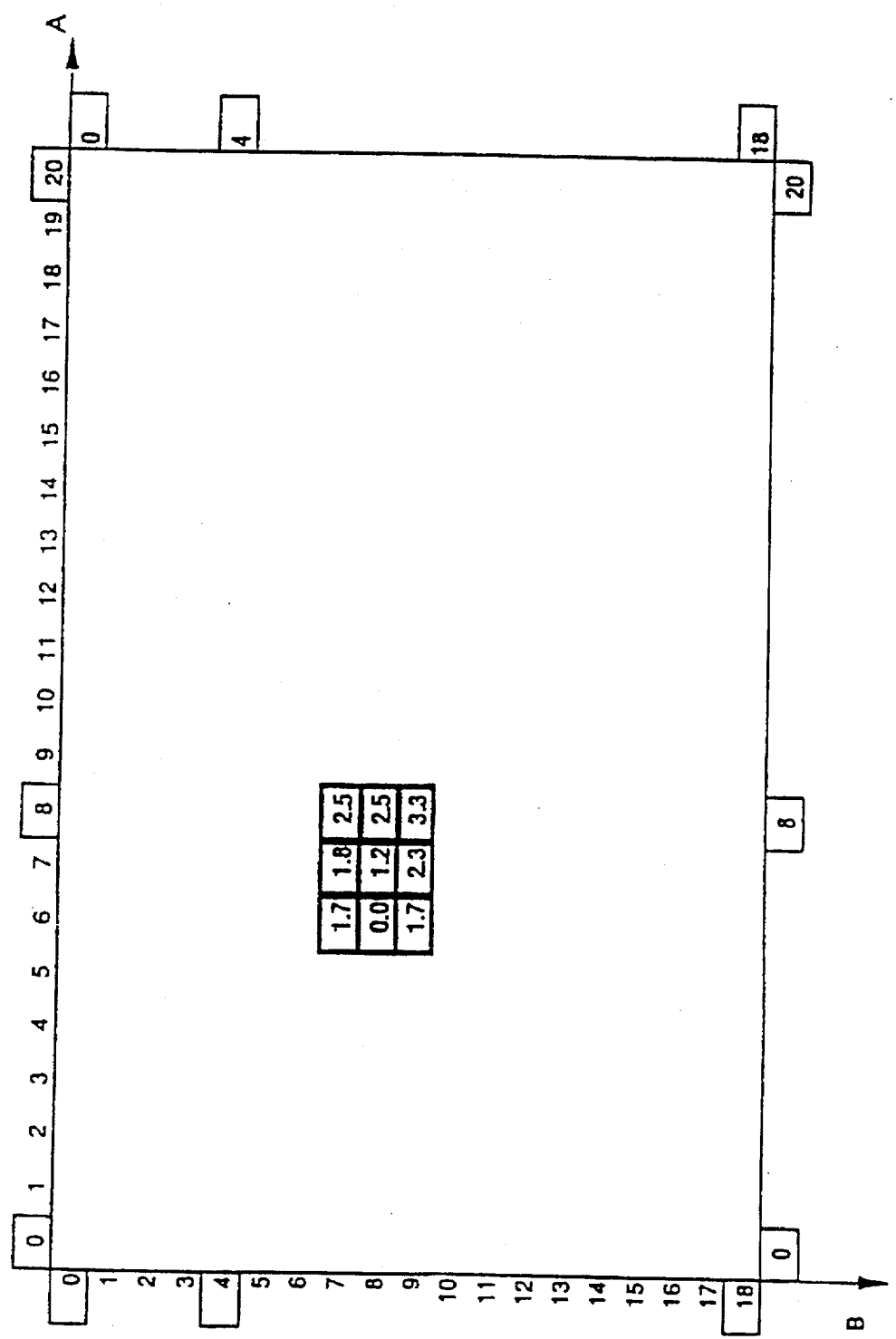

For the fourth iteration the point with ΔE=1.7 (A=6, B=9) is selected as the new pivot point and the ranges are maintained at 1, 1, 1 and 1. The result is shown in FIG. 7d. With this iteration the minimum ΔE is found at the location with Ac=6 and Bc=8. This ΔE is smaller than the predefined minimum ΔE and therefore the method is ended. Extending this to the three-dimensional ABC structure, a Cc value would, of course, also be provided, which together with the Ac and Bc values represents the triplet providing this minimum ΔE.

b. Modified binary method

When one of the ranges in the binary method described above is much smaller than the other ranges, it decreases to the predetermined minimum value very early in the course of the method, thus reducing the effectiveness of that method. The modified binary method avoids this effect. Its iterations are the same as the ones of the binary method, except that the ranges are only reduced when the smallest ΔE value is found for the point located inside the cuboid, i.e. the pivot point. This means that the pivot point is the same as in the previous iteration. In all other cases (the 26 points on the sides of the cuboic) the ranges are not reduced. The criteria for stopping the method are the same as in the binary method.

FIG. 8 shows the sequences occurring when this method is used with the data of the two-dimensional example. FIG. 8a is identical to FIG. 7a since the first iteration values of both methods are the same. For the second iteration the location with ΔE=5,7 (A=4, B=11) is selected as the new pivot point. The ranges are not reduced, since this new pivot point is different from the one used during the first iteration. This leads to the result shown in FIG. 8b. For the third iteration the location with ΔE=2,9 (A=4, B=9) is selected and the ranges are not reduced. This leads to the result shown in FIG. 8c. For the fourth iteration the location with ΔE=2,9 (A=4, B=9) is the same pivot point as in the third iteration and therefore the ranges are reduced to respectively 2, 3, 1 and 3. This leads to the result shown in FIG. 8d. For the fifth iteration the location with ΔE=1,2 (A=7, B=8) is selected and the ranges are not reduced. This leads to the result shown in FIG. 8e. For the sixth iteration the location with ΔE=1,2 (A=7, B=8) is the same pivot point as in the fifth iteration and therefore the ranges are reduced in this case to 1 1, 1 and 1, respectively. This leads to the result shown in FIG. 8f. With this iteration the minimum ΔE is found at the location with Ac=6 and Bc=8. This ΔE is smaller than the predefined minimum ΔE and therefore the method is stopped.

c. Incremental method

The modified binary method avoids the fast reduction of the smallest range to a predefined minimum value of one, but, on the other hand, the large ranges maintained at the beginning of the method introduce additional iterations. The incremental method also avoids the fast reduction of the smallest range to a value of one, however, without introducing additional iterations. The method starts with sufficiently small and identical ranges so that they simultaneously decrease to zero. The testing of the criteria for stopping the method becomes easier to implement too, since the values of the ranges do not have to be checked individually.

Figure 9A:
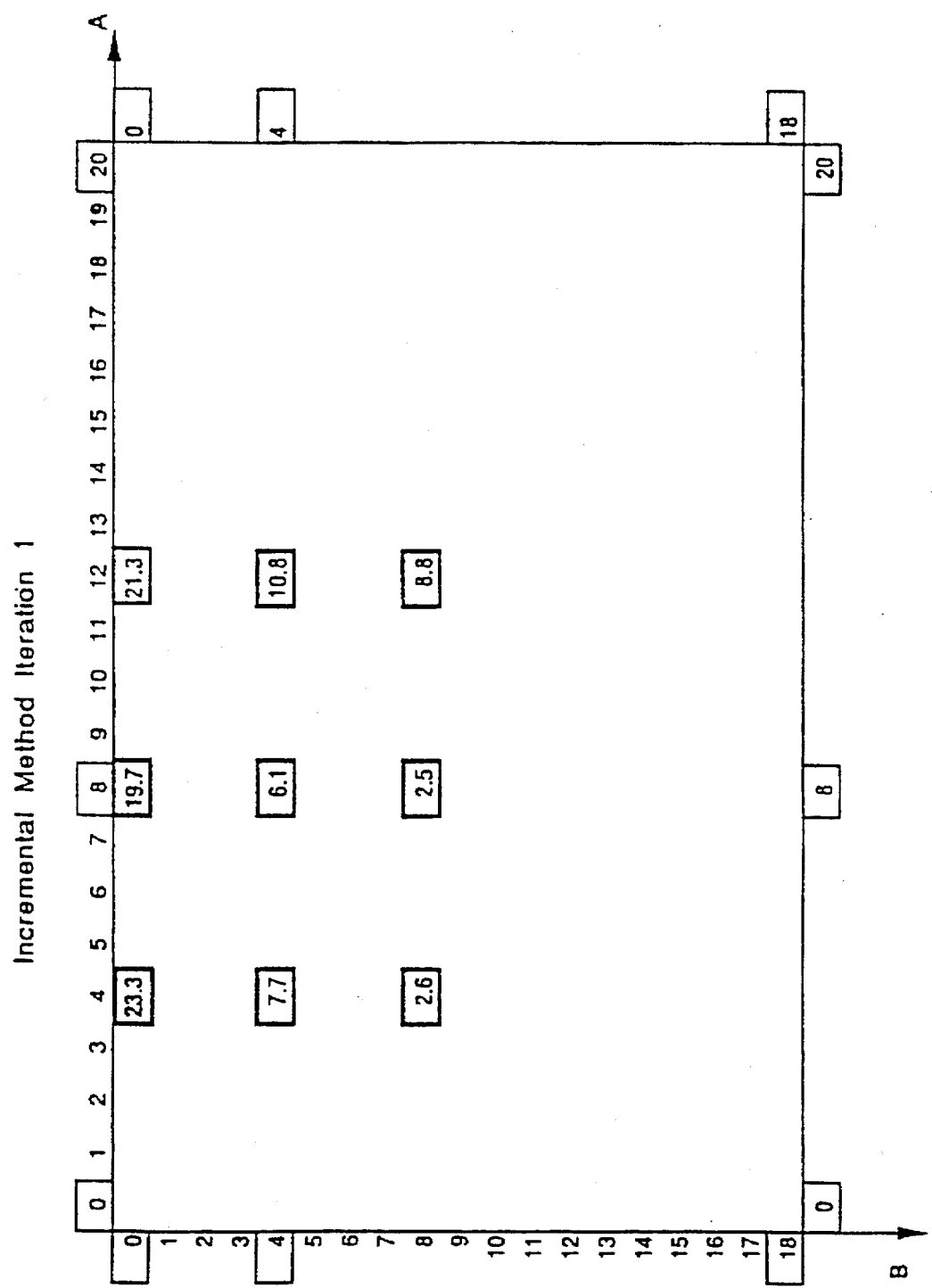
FIG. 9a–9c show the $\Delta E$ results for each iteration of the incremental method of the present invention.
Figure 9B:
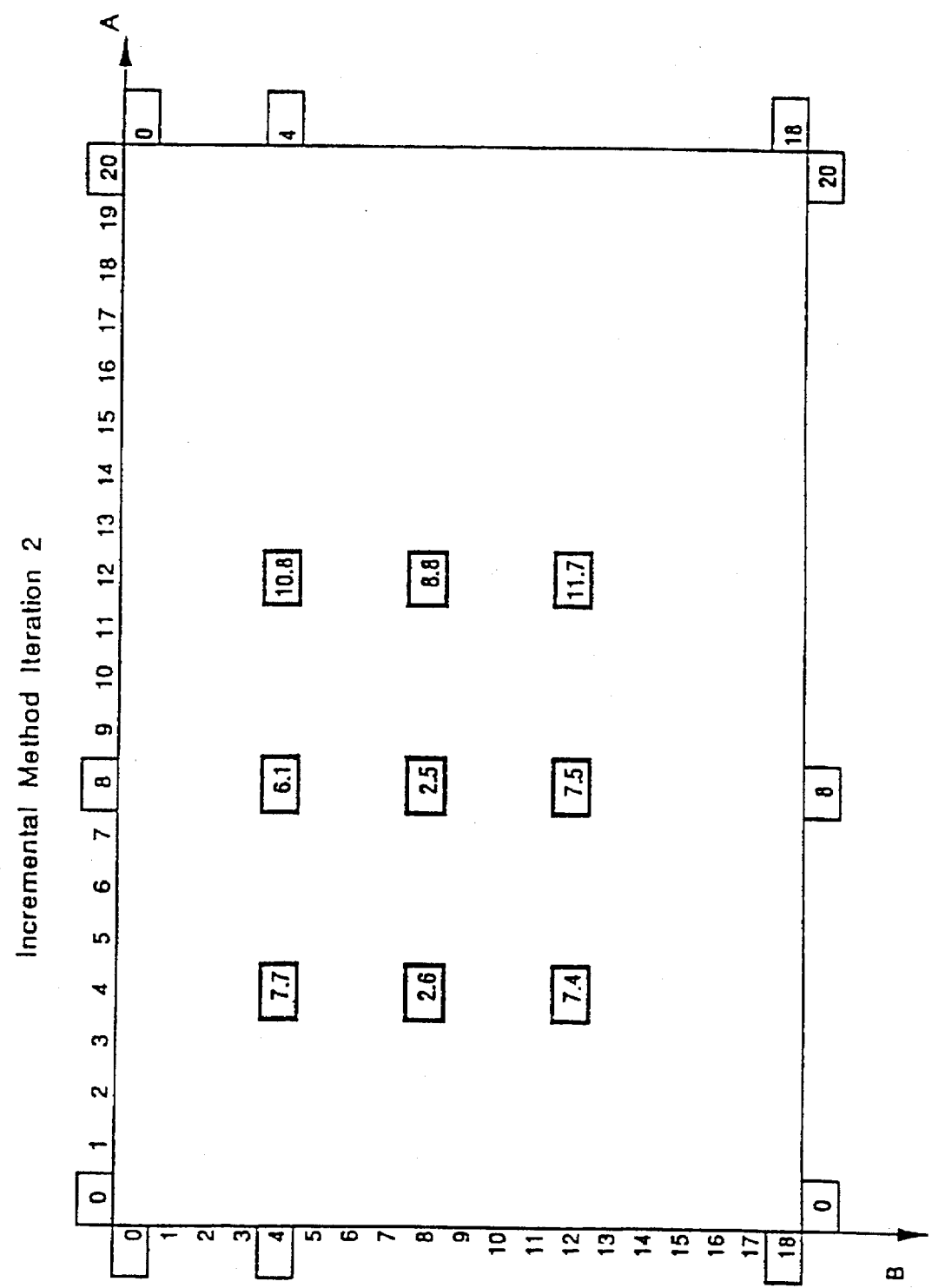
Figure 9C:
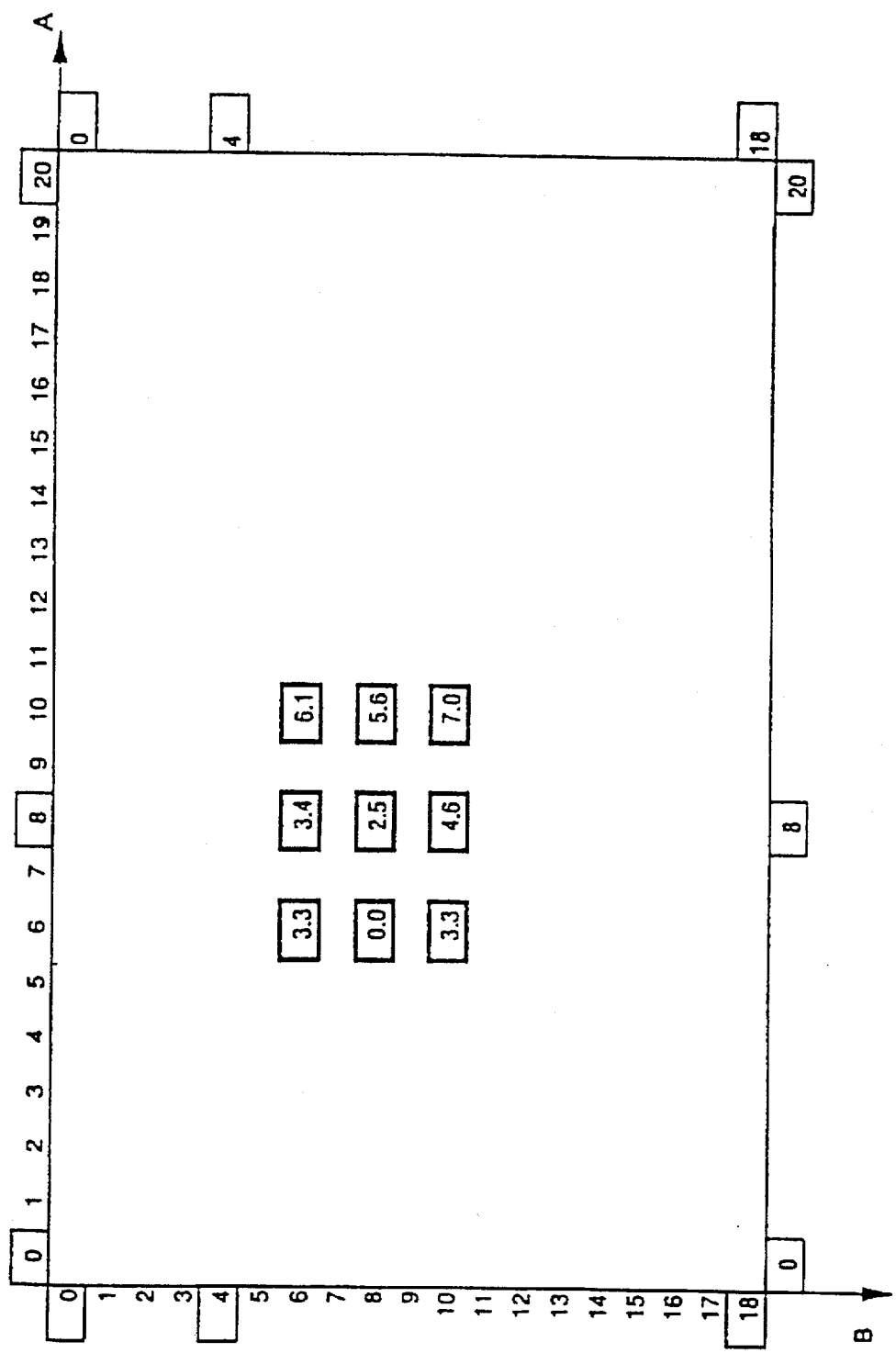

FIG. 9 shows the sequences occurring when this method is used with the data of the two-dimensional example. FIG. 9a shows the results of the first iteration starting from location Ac=8, Bc=4 and the eight locations obtained with all the ranges equal to 4. For the second iteration the location with ΔE=2,5 (A=8, B=8) is selected as the new pivot point and the ranges are not reduced. This leads to the result shown in FIG. 9b. For the third iteration the location with ΔE=2,5 (A=8, B=8) is the same pivot point as in the second iteration and therefore the ranges are reduced from 4 to 2. This leads to the result shown in FIG. 9c. With this iteration the minimum ΔE is found at the location with Ac=6 and Bc=8. This ΔE is smaller than the predefined minimum ΔE and therefore the method is stopped.

The final result of each of the three implementations of the method is a triplet of ABC values, the corresponding triplet of L*a*b* values and the resulting ΔE. If the ΔE is larger than the predetermined minimum, this means that the target color is not within the color gamut of the color output device and cannot be reproduced accurately by this device. In this case the triplet of ABC values will contain one or more minimum or maximum values defining a location on the border of the color gamut closest to the target color and the ΔE value indicates how far the target color is located from this border value.

The above preferred embodiments have been described using the CIEL*a*b* color space. However, one may also start with the LCH space, the Luv space or any other device-independent color space. For each LCH triplet the corresponding CIEL*a*b* triplet can be calculated using the following equations:

$$L = L \tag{4}$$

$$a = C \times \cos(H) \tag{5}$$

$$b = C \times \sin(H) \tag{6}$$

The resulting L*a*b* values are then used as target color coordinates in the above described method. The values of the color image signals A, B and C returned by the method can be stored in an inverted conversion table indexed by the L, C, H triplets. Also the "out-of-gamut" information (ΔE value and an "out-of-gamut" indicator) can be stored in a similar conversion table also indexed by the L, C, H triplets. Thus, one can set up a conversion table for predictive color reproduction of colors defined by LCH (Luminance, Chroma, Hue) coordinates. This is illustrated by the following example. The grid of the conversion table, for example, is defined by 11 values for L (from 0 to 100 in increments of 10), 11 values for C (from 0 to 100 in increments of 10) and 24 values for H (from 0 to 360 in increments of 15). This gives 11×11×24=2904 combinations of LCH coordinate triplets. For each LCH combination the present invention is applied to find the ABC triplets which can then be stored in the conversion table indexed by the LCH triplets.

13

I claim:

1. Method for generating device-dependent signals representative of target colors, using a first conversion table containing device-dependent color image signal triplets of a color output device and their corresponding device-independent coordinate triplets, said method comprising:

(1) determining in said conversion table a first device-independent coordinate triplet having the smallest first color difference value ΔE with respect to the device-independent coordinate triplet of a target color, and (2) determining from said first determined device-independent coordinate triplet a device-dependent color image signal triplet which, when employed to generate a color with said output device at least approximates said target color wherein said second determining step (2) is based on a group of known preselected device-dependent color image signal triplets surrounding a given device-dependent color image signal triplet, the device-independent coordinate triplets of said preselected device-dependent color image signal triplets being either known or calculated by interpolation from device-independent coordinate triplet/device-dependent color image signal triplet sets known from said first conversion table, each one of the group of said device independent coordinate triplets of said preselected device-dependent color image signal triplets is compared with the device independent coordinate of said target color and the device-dependent color image signal triplet corresponding to the device independent coordinate triplet of said group for which a second color difference ΔE with respect to the device-independent coordinate triplet of said target color is the smallest is selected as said generated device-dependent color image signal triplet.

2. Method according to claim 1, wherein said conversion table relates actual device-dependent color image signal triplets with device-independent coordinate triplets measured from the color generated by said respective actual device-dependent color image signal triplets using said color output device.

3. Method according to claim 1 or 2, further comprising the step of:

(3) storing the device-independent coordinate triplet of said target color as an input triplet and said generated device-dependent color image signal triplet, determined during step (2), as an output triplet in the form of a second conversion table.

4. Method according to claim 1, in which said first or second color difference value ΔE is the distance in the device-independent CIEL*a*b* space between the device-independent coordinate triplet of said target color and the device-independent coordinate triplet corresponding to a device-dependent color image signal triplet in particular the weighted distance.

5. Method according to claim 4, wherein step (2) includes determining the presence of a target color outside the color gamut of said color output device, if at least one value of said new triplet Ac, Bc, Cc is a minimum or a maximum value of the A, B, C space of said color output device and said corresponding third difference value ΔE is larger than said predetermined minimum difference value.

6. Method according to claim 1, in which a device-dependent color image signal coordinate triplet, preferably corresponding to said first device-independent coordinate triplet, is indicated as a pivot triplet Ac, Bc, Cc; said second determining step (2) further comprising the following steps:

(a) selecting for each value of said pivot triplet Ac, Bc, Cc a positive and a negative increment on the respective A,

14

B and C axis of the ABC color space of said output device, thus defining two new additional points on each of the A, B and C axes;

(b) determining all possible A, B, C combination triplets from said pivot triplet and said increments and calculating the corresponding device-independent coordinate triplets by interpolation using the device-independent coordinate triplets stored in said first conversion table for device dependent ABC triplets neighboring said A, B, C combination triplets;

(c) calculating for each said calculated device-independent coordinate triplet a third difference value ΔE with respect to the device-independent coordinate triplet of said target color;

(d) selecting from said A, B, C combination triplets and said pivot triplet the one corresponding to the calculated device-independent coordinate triplet having the smallest third difference value ΔE as a new triplet Ac, Bc, Cc; and, (e) ending the method, preferably when said smallest calculated third difference value ΔE is smaller than a predetermined minimum difference value, and using said new pivot triplet Ac, Bc, Cc as said generated device-dependent color image signal triplet.

7. Method according to claim 6, in which at least one, preferably each of said increments, of step (a) is determined by one of a reduction by a predetermined value in comparison with the previous increments and maintained at a respective predetermined minimum value, thus defining two new additional points on each A, B and C axis.

8. Method according to claim 6 or 7, in which (e) comprises ending the method when said increments are equal to their respective predetermined minimum value and when the new triplet Ac, Bc, Cc is identical to the one of the previous iteration, and using the new triplet Ac, Bc, Cc as said generated device-dependent image signal triplet.

9. Method according to claim 7 in which said reduction of said increments is only executed if said new triplet Ac, Bc, Cc is identical to the previous Ac, Bc, Cc.

10. Method according to claim 7, in which all increments are reduced so as to have the same distance with respect to said pivot point on each of the three A, B and C axes.

11. Method according to claim 6, in which all increments in said step (a) have the same distance with respect to said pivot point on each of the three A, B and C axes.

12. Method according to claim 6 wherein step (e) includes repeating steps (a) to (d) employing said new triplet Ac, Bc, Cc determined in step (d) as said pivot triplets for step (a) in the next iteration.

13. Method according to claim 1, wherein said second determining step (2) furthermore includes determining the presence of a target color outside the color gamut of said color output device.

14. Apparatus for generating device-dependent signals representative of target colors, comprising:

(a) first input means for receiving a device-independent coordinate triplet of a given target color;

(b) first memory means in which a conversion table is stored, said first conversion table containing device-dependent color image signal triplets of a color output device and their corresponding device-independent coordinate triplets;

(c) first data processor means for performing, on the basis of said first conversion table, a conversion of said device-independent triplet of said given target color into a generated device-dependent color image signal coordinate triplet which, when employed to generate a color with said color output device, at least approximates said target color, said first data processing means further comprising:

first determining means for determining, in said first conversion table, a first device-independent coordinate triplet having the smallest first color difference value ΔE with respect to the device-independent coordinate triplet of said target color; and, second determining means for determining from said first device-independent coordinate triplet said generated device-dependent color image signal coordinate triplet; wherein said second determining means bases the determination of said first device-dependent color image signal coordinate triplet on a group of known preselected device-dependent color image signal triplets surrounding a given device-dependent color image signal triplet, the device-independent coordinate triplets of said preselected device-dependent color image signal triplets being either known or calculated by interpolation from device-independent coordinate triplet/device-dependent color image signal triplet sets known from said first conversion table, each one of the group of said device independent coordinate triplets of said preselected device-dependent color image signal triplets is compared with the device independent coordinate of said target color and the device-dependent color image signal triplet corresponding to the device independent coordinate triplet of said group for which a second color difference ΔE with respect to the device-independent coordinate triplet of said target color is the smallest is selected as said generated device-dependent color image signal triplet.

15. Apparatus according to claim 14, further comprising:
(d) second memory means for storing the device-independent coordinate triplet of said target color as an input triplet and said generated device-dependent color image signal triplet, which at least approximates said target color, as an output triplet in the form of a second conversion table.

16. Apparatus according to claim 14, said apparatus being said color output device.

17. Apparatus according to any of claims 14 through 16, in which said first or second color difference value ΔE is the distance in the device-independent CIEL*a*b* space between said device-independent coordinate triplet of said target color and the device-independent coordinate triplet corresponding to a device-dependent color image signal triplet, in particular the weighted distance.

18. Apparatus according to claim 16 further comprising:
(d) second memory means for storing the device-independent coordinate triplet of said target color as an input triplet and said generated device-dependent color image signal triplet, which at least approximates said target color, as an output triplet in the form of a second conversion table.

19. Apparatus according to claim 18 further comprising:
(e) second input means for receiving device-independent coordinate triplets of target colors as input triplets;
(f) second data processing means for determining for an input triplet of a target color, received by said second input means the corresponding output triplet on the basis of said second conversion table stored in said second memory means; and
(g) output means for outputting a color represented by an output triplet determined by said second data processing means, said output color at least approximating a target color.

20. Apparatus according to claim 14, in which said first data processor means further comprises:
indicator means for setting a device-dependent color image signal coordinate triplet, preferably corresponding to said first device-independent coordinate triplet, as a pivot triplet Ac, Bc, Cc; and
processing means adapted for executing the following steps:
(a) selecting for each value of said pivot triplet Ac, Bc, Cc, a positive and a negative increment on the respective A, B, and C axis of the ABC color space of said output device, thus defining two new additional points on each of the A, B, and C axes;
(b) determining all possible A, B, C combination triplets from said pivot triplet and said increments and calculating the corresponding device-independent coordinate triplets by interpolation using the device-independent coordinate triplets stored in said first conversion table for device dependent ABC triplets neighboring A, B, C combination triplets;
(c) calculating for each said calculated device-independent coordinate triplet a third difference value ΔE with respect to the device-independent coordinate triplet of said target color;
(d) selecting from said A,B, C combination triplets and said pivot triplet, the one corresponding to the calculated device-independent coordinate triplet having the smallest third difference value ΔE as a new triplet Ac, Bc, Cc; and,
(e) ending the method, preferably when said smallest calculated third difference value is smaller than a predetermined minimum difference value, and using said new pivot triplet Ac, Bc, Cc as said generated device-dependent color image signal triplet.

21. Apparatus according to one of the claims 14 through 16 or 20, further comprising information output means outputting a signal indicative of the presence of a target color, received by said input means, which lies outside the color gamut of said color output device.

22. Apparatus according to claim 20, further comprising detecting means for detecting the presence of a target color, received by said input means, which lies outside the color gamut of said color output device, if at least one value of said new triplet Ac, Bc, Cc of said step (e) is a minimum or a maximum value of the A, B, C color space of said color output device and said corresponding third difference value ΔE is larger than said predetermined minimum difference value.

23. Apparatus according to claim 20 wherein said processing means is adapted to repeat steps (a) to (d) employing said new triplets Ac, Bc, Cc determined in step (d) as said pivot triplet for step (a) in the next iteration.

24. Apparatus according to claim 23 in which at least one, preferably each of said increments, of step (a) is determined by one of a reduction by a predetermined amount in comparison with the previous increments and maintenance at a respective predetermined minimum value, thus defining two new additional points on each A, B, C axis.

25. Apparatus according to claim 23 or 24 in which said processing means is adapted to end the iterations when said increments are equal to their respective predetermined minimum value and when the new triplet Ac, Bc, Cc is identical to the one of the previous iteration and to use the new triplet, Ac, Bc, Cc as said generated device-dependent image signal triplet.

26. Color output device, comprising:
(a) first input means for receiving device-independent coordinate triplets of target colors;

(b) storage means for storing generated device-independent color image signal triplets output by an apparatus for generating device-dependent signals representative of target colors, respectively as input and output triplets of a first conversion table, said apparatus comprising:

(1) second input means for receiving a device-independent coordinate triplet of a given target color;

(2) first memory means in which a second conversion table is stored, said second conversion table containing device-dependent color image signal triplets of said color output device and their corresponding device-independent coordinate triplets;

(3) first data processor means for performing, on the basis of said second conversion table, a conversion of said device-independent triplet of said given target color into a generated device-dependent color image signal coordinate triplet which, when employed to generate a color with said color output device, at least approximates said target color, said first data processing means further comprising:

first determining means for determining, in said second conversion table, a first device-independent coordinate triplet having the smallest first color difference value $\Delta E$ with respect to the device-independent coordinate triplet of said target color; and second determining means for determining from said first device-independent coordinate triplet said generated device-dependent color image signal coordinate triplet; wherein said second determining means bases the determination of said first device-dependent color image signal coordinate triplet on a group of known preselected device-dependent color image signal triplets surrounding a given device-dependent color image signal triplet, the device-independent coordinate triplets of said preselected device-dependent color image signal triplets being either known or calculated by interpolation from device-independent coordinate triplet/device-dependent color image signal triplet sets known from said second conversion table, each one of the group of said device independent coordinate triplets of said preselected device-dependent color image signal triplets is compared with the device independent coordinate of said target color and the device-dependent color image signal triplet corresponding to the device independent coordinate triplet of said group for which a second color difference $\Delta E$ with respect to the device-independent coordinate triplet of said target color is the smallest is selected as said generated device dependent color image signal triplet, (c) second data processing means for determining for a device-independent coordinate triplet of a target color, received by said first input means, the corresponding device-dependent color image signal triplet on the basis of said first conversion table stored in said storage means; and, (d) output means for outputting a color represented by a device-dependent color image signal triplet determined by said second data processing means, said output color at least approximating a target color.

27. Color output device according to claim 26, wherein said color output device is a color printer.

28. Color output device according to claim 26, wherein said color output device is a color copier.

29. Color output device according to claim 26, said first data processing means further comprising: indicator means for setting a device-dependent color image signal triplet, preferably corresponding to said first device-independent coordinate triplet, as a pivot triplet Ac, Bc, Cc, and third data processing means adapted for executing the following steps:

(a) selecting for each value of said pivot triplet Ac, Bc, Cc, a positive and a negative increment on the respective A, B and C axis of the ABC color space of said output device, thus defining two new additional points on each of the A, B an C axes;

(b) determining all possible A, B, C combination triplets from said pivot triplet and said increments and calculating the corresponding device-independent coordinate triplets by increments and calculating the corresponding device-independent coordinate triplets by interpolation using the device-independent coordinate triplets stored in said first conversion table for device dependent ABC triplets neighboring A, B, C combination triplets;

(c) calculating for each said calculated device-independent coordinate triplet a third difference value $\Delta E$ with respect to the device-independent coordinate triplet of said target color;

(d) selecting from said A, B, C combination triplets and said pivot triplet, the one corresponding to the calculated device-independent coordinate triplet having the smallest third difference value $\Delta E$ as a new triplet Ac, Bc, Cc; and (e) ending the method, preferably when said smallest calculated third difference value is smaller than a predetermined minimum difference value, and using said new pivot triplet Ac, Bc, Cc as said generated device dependent color image signal triplet.

30. Color output device according to claim 29, wherein said third data processing means is adapted to repeat steps (a) to (d) employing said new triplet Ac, Bc, Cc determined in step (d) as said pivot triplet for step (a) in the next iteration.

31. Color output device according to claim 29 or 30 in which said processing means is adapted to end the iterations when said increments are equal to their respective predetermined minimum value and when the new triplet Ac, Bc, Cc is identical to the one of the previous iteration -and to use the new triplet Ac, Bc, Cc as said generated device-dependent image signal triplet.

32. Color output device according to claim 30 in which at least one, preferably each of said increments, of step (a) is determined by one of a reduction by a predetermined amount in comparison with the previous increments and maintenance at a respective predetermined minimum value, thus defining two new additional points on each A, B, C axis.

* * * * *